United States Patent
Miyazaki et al.

(10) Patent No.: US 8,406,422 B2
(45) Date of Patent: Mar. 26, 2013

(54) CRYPTOGRAPHIC MODULE MANAGEMENT APPARATUS, METHOD, AND PROGRAM

(75) Inventors: Shingo Miyazaki, Fuchu (JP); Takanori Nakamizo, Chofu (JP); Akito Niwa, Mitaka (JP); Koji Okada, Tokyo (JP); Kouya Tochikubo, Yokohama (JP); Shigeyuki Fukushima, Fuchu (JP); Chiaki Ishikawa, Tokyo (JP); Noboru Koshizuka, Tokyo (JP); Ken Sakamura, Tokyo (JP)

(73) Assignees: Toshiba Solutions Corporation, Toyko (JP); Yokosuka Telecom Research Park, Inc., Yokosuka-shi (JP)

( * ) Notice: Subject to any disclaimer, the term of this patent is extended or adjusted under 35 U.S.C. 154(b) by 1149 days.

(21) Appl. No.: 12/233,131

(22) Filed: Sep. 18, 2008

(65) Prior Publication Data
US 2009/0129586 A1  May 21, 2009

(30) Foreign Application Priority Data
Sep. 28, 2007 (JP) .................. 2007-256316

(51) Int. Cl.
*H04K 1/00* (2006.01)
*H04L 9/00* (2006.01)
*H04L 9/28* (2006.01)
(52) U.S. Cl. ........................................ 380/28
(58) Field of Classification Search .............. 380/28
See application file for complete search history.

(56) References Cited

U.S. PATENT DOCUMENTS
7,096,357 B1 * 8/2006 Tochikubo et al. .......... 713/164

OTHER PUBLICATIONS

Mihir Bellare, et al., "The Exact Security of Digital Signatures—How to Sign with RSA and Rabin", In Advances in Cryptology—Eurocrypt'96 Proceedings, International Conference on the Theory and Applicaton of Cryptographic Techniques, May 12-16, 1996, pp. 399-416.

Mihir Bellare, et al., "Keying Hash Functions for Message Authentication", In Advances in Cryptology—CRYPTO'96, 16th Annual International Cryptology Conference, Aug. 18-22, 1996, pp. 1-15.

* cited by examiner

*Primary Examiner* — Kambiz Zand
*Assistant Examiner* — Stephen Sanders
(74) *Attorney, Agent, or Firm* — Oblon, Spivak, McClelland, Maier & Neustadt, L.L.P.

(57) ABSTRACT

A cryptographic module management apparatus searches for cryptographic module meta-information based on the category information of a requested cryptographic module and, if associated cryptographic module category information is contained in this cryptographic module meta-information, searches for the cryptographic module meta-information of an associated cryptographic module, to generate composite type cryptographic module evaluation information based on this cryptographic module meta-information, select a cryptographic module based on this composite type cryptographic module evaluation information, and read this cryptographic module from a cryptographic module storage portion and output such composite type cryptographic module evaluation information.

10 Claims, 21 Drawing Sheets

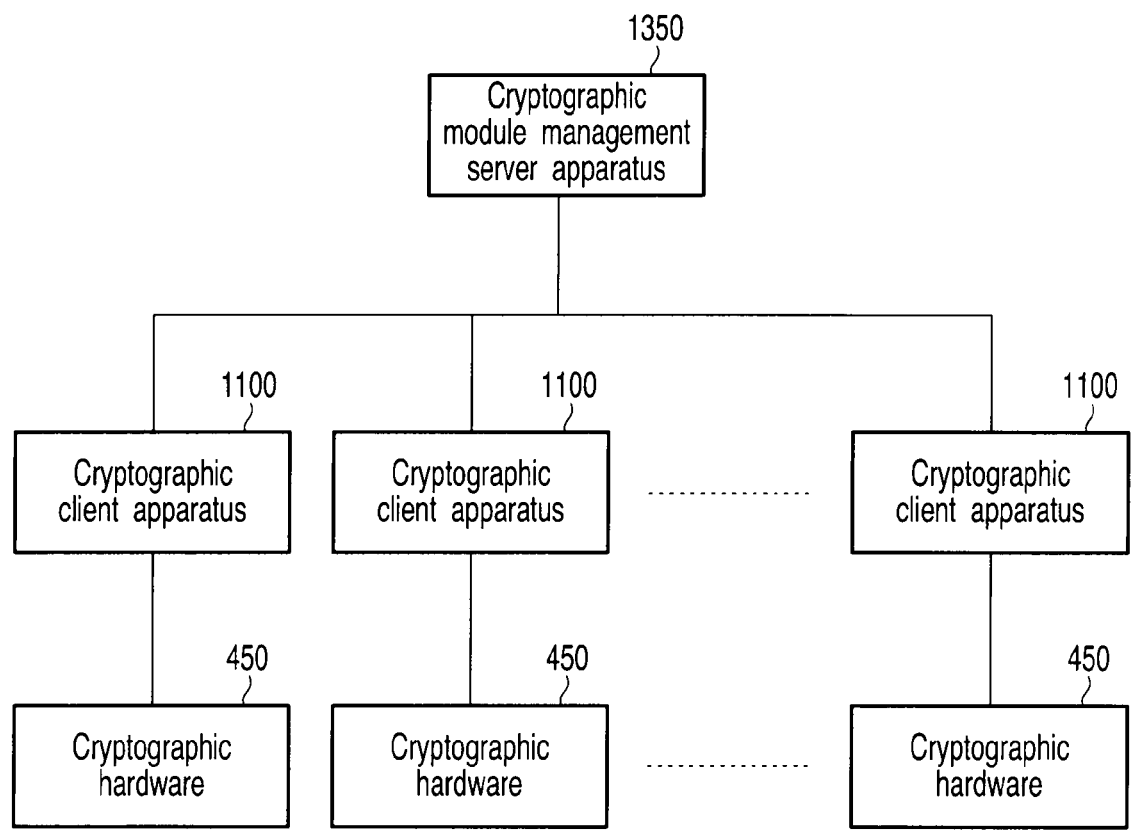
F I G. 4

| [KEY] Policy (condition information for cryptographic modules containing category information is converted into character string) | |
|---|---|
| Highest-order cryptographic module evaluation description portion ID | Highest-order cryptographic module evaluation description portion ID of cryptographic module correlated with this policy |
| Algorithm ID | Algorithm ID correlated with this policy |
| Number of cryptographic modules to be linked | Number of terminal cryptographic modules correlated with this policy |
| Group of cryptographic module IDs to be linked | (A plurality of) terminal cryptographic module IDs correlated with this policy |
| Key length | Length of cryptographic key used when performing cryptographic processing |

F I G. 6

| | |
|---|---|
| [KEY] cryptographic module evaluation description portion ID | |
| Version-attendant cryptographic module evaluation description portion ID | Cryptographic module evaluation description ID containing version No. |
| Cryptographic module ID | Implemented cryptographic module portion ID in the case of terminal cryptographic module evaluation description portion in tree structure and, otherwise, NULL |
| Category ID | Category ID of this cryptographic module evaluation description portion |
| Number of references of own cryptographic module evaluation description portions | Count of reference sources of this cryptographic module evaluation description portion (there are two reference sources of selection DB and this cryptographic module LINK DB) |
| Number of cryptographic module evaluation description portions to be linked | Number of cryptographic module evaluation description portions which are lower in order than this cryptographic module evaluation description portion in tree structure |
| Number of cryptographic module evaluation description portion IDs to be linked | Cryptographic module evaluation description portion ID which is lower in order than this cryptographic module evaluation description portion in tree structure |

F I G. 7

| | |
|---|---|
| [KEY] Cryptographic module evaluation description portion ID | |
| Version-attendant cryptographic module evaluation description portion ID linked | Cryptographic module evaluation description ID containing version No. |
| Cryptographic module evaluation description portion ID linked | Terminal cryptographic module evaluation description ID corresponding to this cryptographic module |
| Category ID | Category ID of this cryptographic module |
| Cryptographic module data No. | Data No. for this cryptographic module |
| Module type | Type of this cryptographic module |
| Cryptographic module file name | File name of this cryptographic module |
| Number of selection policies to be linked | Number of policies in selection DB correlated with this cryptographic module |
| Group of policies in selection DB to be linked | Policies in selection DB correlated with this cryptographic module |

F I G. 8

| | |
|---|---|
| [KEY] Key ID | |
| Storage place information | Information about storage (nothing, in terminal, in cryptographic hardware) |
| Key type | Information about cryptographic method type (key data, algorithm-specific parameter, system-specific parameter, certificate) |
| Key file name | File name of key |
| Key entity | Data of key entity |
| Key data encryption information | Information about key data encryption information (no encryption, cryptographic hardware utilization) |
| Key, parameter length | Length information of key and parameters |
| Category ID | Category ID corresponding to this key |
| Algorithm ID | Algorithm ID corresponding to this key |
| Preparer | Information about preparer of this key |
| Use-by date | Information about use-by date of this key |
| Restrictions on number of usage times | Information about restrictions on number of times of using this key |

FIG. 9

| | |
|---|---|
| [KEY] Cryptographic processing ID | |
| Processing type | Information about processing (including key addition, key creation, cryptographic processing) |
| Algorithm ID | Algorithm ID of this processing |
| Cryptographic module evaluation description ID | Cryptographic module evaluation description ID utilized as cryptographic processing or key creation processing |
| Category ID | Category ID of this processing |
| Indirect reference key ID | Key ID in key DB to be referenced indirectly |
| Number of parameters | Number of parameter information groups |
| Parameter information group | Information containing parameter type and size besides parameter body |
| Key information group | Information containing key parameter type, key ID, and key size |

F I G. 10

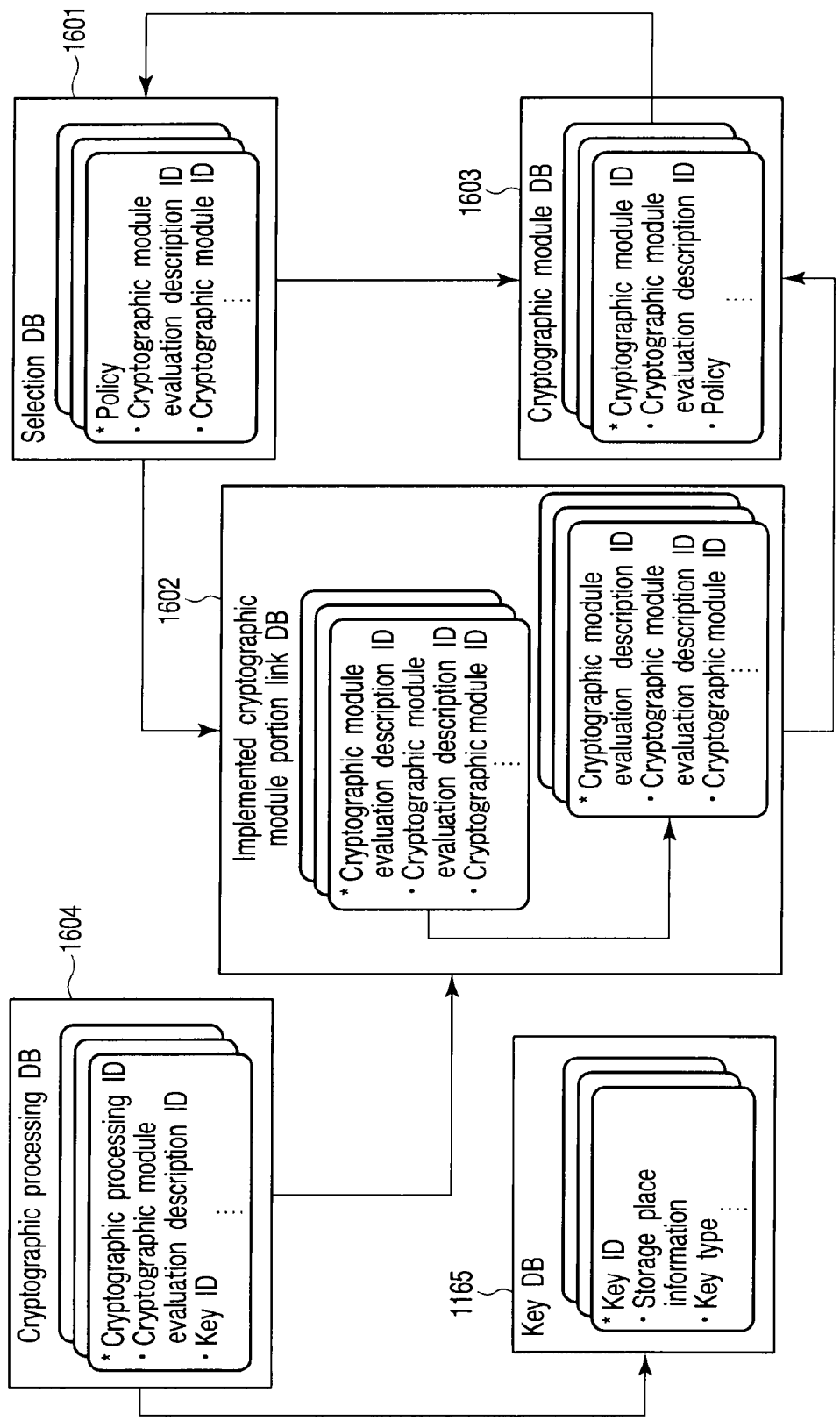
F I G. 11

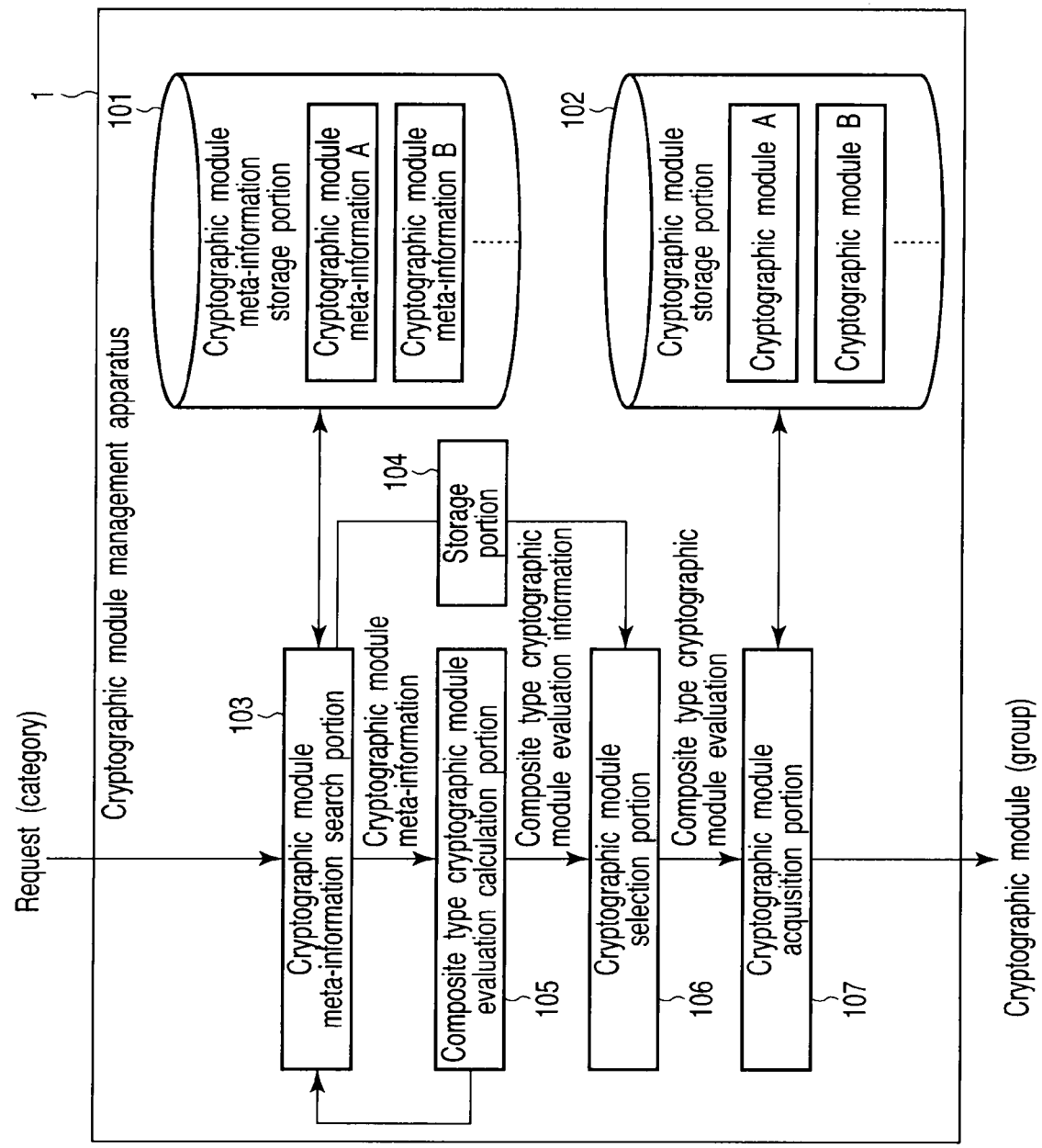
F I G. 13

| Evaluation item | Evaluated mark (unit: point) |
|---|---|
| Security | 60 |
| Speed | 20 |
| Amount of memory used | 30 |

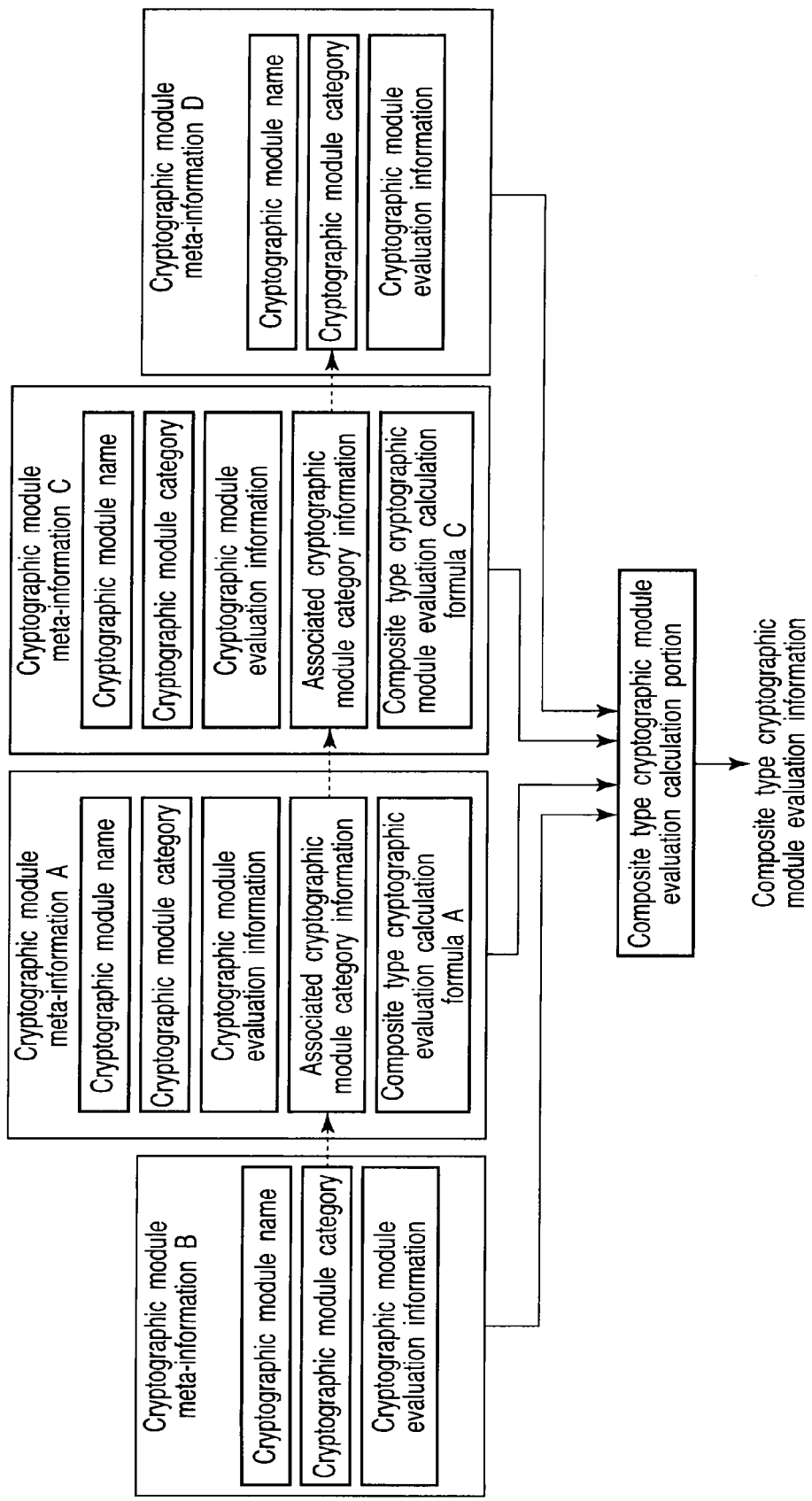
F I G. 16

Meta-information association table

| Higher-order module name | Lower-order module name |
|---|---|
| Composite type name e | Cryptographic module name a |
| Cryptographic module name a | Cryptographic module name b |
|  | Cryptographic module name c |
| Cryptographic module name c | Cryptographic module name d |

F I G. 23

CRYPTOGRAPHIC MODULE MANAGEMENT APPARATUS, METHOD, AND PROGRAM

CROSS-REFERENCE TO RELATED APPLICATIONS

This application is based upon and claims the benefit of priority from prior Japanese Patent Application No. 2007-256316, filed Sep. 28, 2007, the entire contents of which are incorporated herein by reference.

BACKGROUND OF THE INVENTION

1. Field of the Invention

The present invention relates to a cryptographic module management apparatus, method, and program for selecting and delivering a cryptographic module in accordance with cryptographic module evaluation information in response to a cryptographic module delivery request from a client.

2. Description of the Related Art

When confidential information is to be handled, cryptographic processing has generally been performed conventionally. Such cryptographic processing involves use of cryptographic modules. A cryptographic module refers to a program required to perform cryptographic processing, including programs to perform various components of the cryptographic processing (e.g., hash function calculation, pseudo-random number generation processing, etc.). That is, the cryptographic module may come in a single program or the combination of a plurality of programs. In the following description, the cryptographic module can be realized in either of these two cases.

Note that a specific one of various cryptographic modules may be used redundantly in a plurality of cryptographic processing items in some cases. For example, a cryptographic module such as a hash function (SHA-1 etc.) may be used in digital signature generation, authentication code generation, and stand-alone type hash function computation. For use in digital signature generation, refer to an RSASSA described in "The exact security of digital signatures—How to sign with RSA and Rabin" by M. Bellare and P. Rogaway, In Advances in Cryptology—Eurocrypt '96, pp. 399-416, Springer-Verlag, 1996. For use in authentication code generation, see HMAC described in "Keying hash functions for message authentication" by M. Bellare, R. Canetti, and H. Krawczyk, In Advances in Cryptology—CRYPTO'96, pp. 1-15, Springer-Verlag, 1996.

The following will discuss the case of, for example, the management and utilization of cryptographic modules by a mobile terminal, etc., which does not have a large memory capacity. In this case, in order to save on usage of the memory in the mobile terminal, it is preferable to design cryptographic modules in such a manner that each of the modules may be provided for each of cryptographic processing components and the same cryptographic module may be used by the cryptographic processing items commonly.

However, in order to deliver a cryptographic module for each component in response to a selection request from the terminal device, it is necessary to select such a combination of the cryptographic modules as to meet the selection request. Further, to perform an evaluation in a case where the cryptographic modules have been combined, loads on a process from the reception of a selection request to the completion of the selection will be increased, which is a problem.

BRIEF SUMMARY OF THE INVENTION

It is an object of the invention to provide a cryptographic module management apparatus, method, and program that can select an appropriate combination of cryptographic modules from among those maintained at the time when a selection request has been received and mitigate loads on a process from the reception of the cryptographic module selection request to the completion of the selection.

In a first aspect of the present invention, there is provided a cryptographic module management apparatus which manages a plurality of cryptographic modules to select a cryptographic module in response to a cryptographic module selection request and outputs the selected cryptographic module, the cryptographic module management apparatus comprising: a cryptographic module storage device which stores said plurality of cryptographic modules; a cryptographic module meta-information storage device which stores cryptographic module meta-information containing category information indicating a category to which each of the cryptographic modules belongs, first evaluation information indicating a predetermined evaluation result of each of the cryptographic modules, category information indicating, if any associated cryptographic module is required other than the cryptographic modules, a category to which such other associated cryptographic module belongs, and derivation method information indicating a method of deriving composite type cryptographic module evaluation information which indicates predetermined evaluation information of evaluation performed on a case where the cryptographic modules and such other associated cryptographic module are combined, from the first evaluation information and second evaluation information indicating a predetermined evaluation result of such other associated cryptographic module; a cryptographic module meta-information search device configured to search the cryptographic module meta-information storage device for the cryptographic module meta-information based on the category information of the requested cryptographic module; a composite type cryptographic module evaluation calculation device configured to generate the composite type cryptographic module evaluation information as the evaluation information of the cryptographic modules based on, if associated cryptographic module category information is contained in the cryptographic module meta-information searched for by the cryptographic module meta-information search device, the second evaluation information which is the composite type cryptographic module evaluation information obtained by searching for the cryptographic module meta-information of the associated cryptographic module by using the cryptographic module meta-information search device and specifying the cryptographic module meta-information of each of the associated cryptographic modules obtained as a result of the search to thereby recursively invoke this composite type cryptographic module evaluation calculation device; and the derivation method information contained in the cryptographic module meta-information of the cryptographic modules; a cryptographic module selection device configured to obtain the result of calculation by the composite type cryptographic module evaluation calculation device and, based on this obtained calculation result, select the cryptographic module; and a cryptographic module acquisition device configured to read from the cryptographic module storage device the cryptographic module selected by the cryptographic module selection device and output such cryptographic module.

Thus, according to the first aspect, when a cryptographic module selection request has been received from outside, the cryptographic module meta-information of a category that corresponds to category information in that selection request is searched for. In this case, since the cryptographic module meta-information about combinable cryptographic modules is fitted with associated cryptographic method category information, which is in turn associated with category information of other cryptographic module meta-information, it is possible to recursively invoke the combinable cryptographic module meta-information pieces by using, as a starting point, the cryptographic module meta-information of the category that corresponds to the category information in the selection request, thereby generating evaluation information in a case where the cryptographic modules have been combined. This evaluation information will be generated based on derivation method information stored in the relevant cryptographic module meta-information, by using evaluation information stored in the cryptographic module meta-information and evaluation information contained in cryptographic module meta-information, which is an associated cryptographic module of the relevant cryptographic module meta-information. Then, based on the generated evaluation information, a cryptographic module will be selected and output.

In a second aspect of the present invention, there is provided a cryptographic module management apparatus which manages a plurality of cryptographic modules to select the cryptographic module in response to a cryptographic module selection request and output the selected cryptographic module, the cryptographic module management apparatus comprising: a cryptographic module storage device which stores said plurality of cryptographic modules; a composite type meta-information storage device which stores composite type meta-information containing category information indicating a category of the highest-order cryptographic module of the cryptographic modules to be combined, composite type cryptographic module evaluation information indicating predetermined evaluation information of evaluation performed in a case where the cryptographic modules are combined, and combined cryptographic module identification information containing cryptographic module identification information which identifies each cryptographic module included in a combination of the cryptographic modules; cryptographic module selection devices configured to search the composite type meta-information storage device for a plurality of pieces of the composite type meta-information based on the category information of the cryptographic modules corresponding to the selection request and, based on the composite type cryptographic module evaluation information in the composite type meta-information obtained, select the cryptographic modules to be included in the combination; and a cryptographic module acquisition device configured to read from the cryptographic module storage device the cryptographic module selected by the cryptographic module selection device and output such selected cryptographic module, wherein the composite type cryptographic module evaluation information is evaluation information of evaluation performed in the case where the cryptographic modules are combined, the evaluation information being calculated using a predetermined derivation method based on the evaluation information of each of the cryptographic modules to be combined.

Thus, according to the second aspect, the result of calculation of the evaluation information in a case where the cryptographic modules have been combined is stored as composite type meta-information. In this case, the information of evaluation performed on combined cryptographic modules will be stored as the result of calculations performed by using a predetermined derivation method based on the evaluation information of each of those cryptographic modules combined. In such a manner, according to a predetermined derivation method, evaluation information in a case where cryptographic modules have been combined is generated and stored, so that the cryptographic modules will be selected with no need to generate evaluation information when a selection request has been received, by referencing this evaluation information.

According to the third aspect, the cryptographic module management apparatus according to the second aspect further comprises a cryptographic module meta-information storage device which stores cryptographic module meta-information containing category information indicating a category to which the cryptographic modules belong, evaluation information indicating a result of evaluation of the cryptographic modules, associated cryptographic module category information indicating, if any associated cryptographic module is required to execute the cryptographic modules, the category to which the associated cryptographic module belongs, and derivation method information indicating a method of deriving composite type evaluation information which indicates the evaluation information of evaluation performed in a case where the cryptographic modules and the associated cryptographic module are combined, from the evaluation information set to the cryptographic modules and the evaluation information set to the associated cryptographic module if the associated cryptographic module is required to execute the cryptographic module; a composite type cryptographic module evaluation calculation device configured to generate the composite type cryptographic module evaluation information as the evaluation information of the cryptographic modules based on, if the associated cryptographic module category information is contained in the specified cryptographic module meta-information, the evaluation information of the associated cryptographic module obtained by searching for the cryptographic module meta-information of the associated cryptographic modules by using the cryptographic module meta-information search device and specifying the cryptographic module meta-information of each of the associated cryptographic modules obtained as a result of the search to thereby recursively invoke the composite type cryptographic module evaluation calculation device; and the derivation method information contained in the cryptographic module meta-information of the cryptographic modules; and a writing device configured to write into the composite type meta-information storage device the composite type cryptographic module evaluation calculated by the composite type cryptographic module evaluation calculation device.

Thus, in the third aspect, cryptographic module meta-information is stored beforehand, so that based on this stored cryptographic module meta-information, evaluation information in a case where cryptographic modules have been combined is generated and written into a composite type cryptographic meta-information storage portion. Accordingly, if the need occurs for the cryptographic module management apparatus to manage new cryptographic modules, it is possible to generate evaluation information in a case where those new cryptographic modules are combined and store this information.

BRIEF DESCRIPTION OF THE SEVERAL VIEWS OF THE DRAWING

FIG. 4 is a block diagram of a constitution of a cryptographic module delivery system according to a second embodiment of the invention;

FIG. 6 shows a data composition example of a selection DB according to the same embodiment;

FIG. 7 shows a data composition example of a cryptographic module link DB according to the same embodiment;

FIG. 8 shows a data composition example of a cryptographic module DB according to the same embodiment;

FIG. 9 shows a data composition example of a key information DB according to the same embodiment;

FIG. 10 shows a data composition example of a cryptographic processing DB according to the same embodiment;

FIG. 11 shows a logical composition of databases according to the same embodiment;

FIG. 13 is a functional block diagram of a cryptographic module management apparatus according to a third embodiment of the invention;

FIG. 16 is an explanatory diagram of cryptographic module meta-information by use of associated cryptographic method category information;

FIG. 23 is a table showing one example of a meta-information association table according to the same embodiment.

DETAILED DESCRIPTION OF THE INVENTION

The following will describe a cryptographic module delivery system according to one embodiment of the invention with reference to the drawings.

First, the present system will be outlined below. In the present system, a server and a client apparatus are connected to each other and so can mutually send and receive information which has been encrypted by using cryptographic modules. In this case, the cryptographic modules can also be switched over periodically. As such a cryptographic system that can switch cryptographic modules, several frameworks are available which establish an interface independent of an encryption method for each cryptographic technique and can be implemented by each cryptography vendor. They include, for example, CyptAPI of Microsoft™, JCA (Java™ Cryptographic Architecture)/JCE (Java™ Cryptographic Extensions) of Sun™, and CDSA (Common Data Security Architecture) of Group™.

In those frameworks, it is possible to establish an interface through which to access a cryptographic module for each cryptographic technique such as encryption/decryption, signature generation/verification, and authentication code generation/verification so that in accordance with the interface, such an encryption method as DES (Data Encryption Standard) and AES (Advanced Encryption Standard) can be implemented. Accordingly, when building up a system, an expert in cryptography or security can select beforehand an appropriate cryptographic method from among those implemented and enter into the framework a cryptographic parameter that indicates the cryptographic method to be utilized so that the cryptographic methods may be switched between each other.

When such a framework is being utilized and if a security policy in operation of an application system is changed, an expert in cryptography or security has conventionally had to reselect an encryption method suitable for the system, which fact leads to a problem in human resources and costs of the experts in cryptography or security. Further, if an existing encryption method has been found defective or a new encryption method has been announced, a newly changed encryption method cannot smoothly be applied to a system in operation. Furthermore, if different environments in which to implement security need different security levels and processing speeds, the conventional systems will find it difficult to realize optimal security.

In the present system, any cryptographic system capable of switching encryption methods can solve this problem.

First Embodiment

Figure 1:
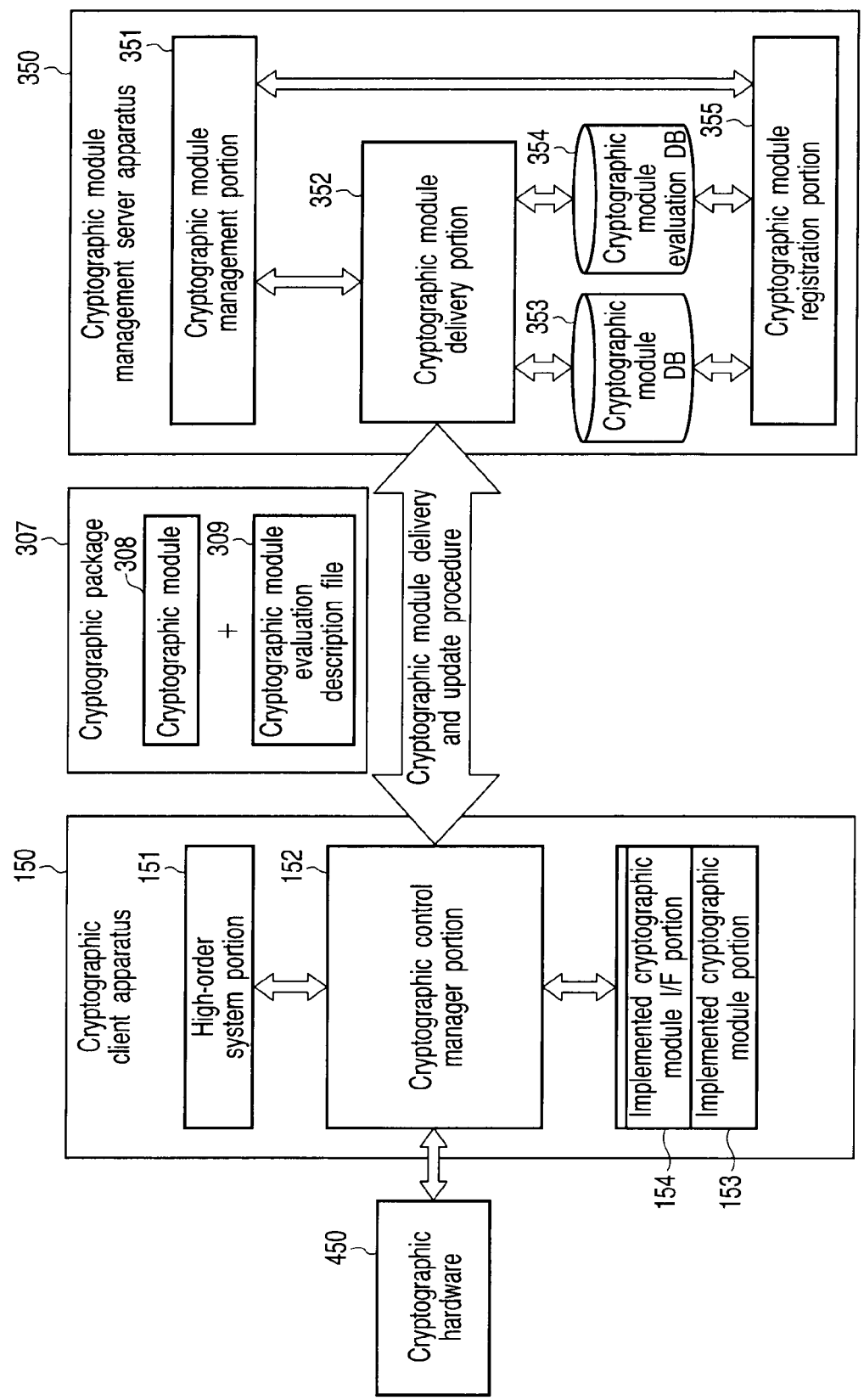
FIG. 1 is a block diagram of a constitution of a cryptographic module delivery system according to a first embodiment of the invention.

FIG. 1 is a block diagram outline of the constitution of a cryptographic module delivery system according to the first embodiment of the invention.

The present cryptographic system includes a cryptographic module management server apparatus 350 that transmits a cryptographic package 307 which includes a cryptographic module 308 and a cryptographic module evaluation description file 309, and a cryptographic client apparatus 150 that performs cryptographic processing by using the received cryptographic package 307. The evaluation of cryptographic modules described in the cryptographic module evaluation description file 309 refers to information containing a numeric representation of a degree of confidence, etc. of an encryption method of the corresponding cryptographic module 308, for example, security of the implemented cryptographic method, the cryptographic processing speed, and the key length that can be utilized in the cryptographic modules.

The cryptographic module management server apparatus 350 includes a cryptographic module DB 353 in which the cryptographic modules 308 are accumulated, a cryptographic module evaluation DB 354 in which the cryptographic module evaluation description files 309 are accumulated, a cryptographic module management portion 351 that manages the cryptographic module DB 353 and the cryptographic module evaluation DB 354, a cryptographic module registration portion 355 that registers new information in the cryptographic module DB 353 and the cryptographic module evaluation DB 354, and a cryptographic package sending portion 352 that reads the optimal cryptographic package 307 from the cryptographic module DB 353 and the cryptographic module evaluation DB 354 in response to a request from the cryptographic client apparatus 150 and transmits the cryptographic package.

The cryptographic client apparatus 150 is constituted of a high-order system portion 151 serving as an application or middleware that invokes a cryptographic function provided by an implemented cryptographic module portion 153 via a cryptographic control manager portion 152 and utilizes such function, the cryptographic control manager portion 152 that receives the cryptographic package 307 transmitted by the cryptographic module management server apparatus 350 or switches the cryptographic functions provided by the implemented cryptographic module portion 153, a tamper-proof cryptographic hardware portion 450 that realizes, through hardware, cryptographic processing by use of a main cryptographic method, and the implemented cryptographic module portion 153 that provides a cryptographic function in a condition where the cryptographic module 308 in which a cryptographic method has been implemented can be executed and utilized. The cryptographic module management server apparatus 350 carries out three procedures of initially registering, delivering, and updating a cryptographic module based on a request from the cryptographic client apparatus 150, thereby transmitting the appropriate cryptographic package 307 to the cryptographic client apparatus 150.

Note that initial registration of a cryptographic module refers to, in a case where the cryptographic client apparatus 150 has no cryptographic module 308 and does not include the implemented cryptographic module portion 153, utilizing the cryptographic hardware portion 450 of the cryptographic client apparatus 150 to thereby securely transmit the cryptographic module 308 indispensable for utilization from the cryptographic module management server apparatus 350 to the implemented cryptographic module portion 153.

Delivery of a cryptographic module refers to the cryptographic module management server apparatus 350 selecting the appropriate cryptographic module 308 or cryptographic package 307 in response to a cryptographic module selection request received from the cryptographic client apparatus 150 and transmitting the selected cryptographic module or package to the cryptographic client apparatus 150. A cryptographic module selection request contains condition information on a cryptographic module, which condition information includes a classification (category) of cryptographic methods such as encryption or signature generation, the maker that created the cryptographic module 308, information of hardware on which the cryptographic module 308 operates, and evaluation information of the cryptographic module. The cryptographic module evaluation information may be handled as the cryptographic module evaluation description file 309 independently from the cryptographic module 308 as in the case of the present embodiment.

Updating of a cryptographic module refers to, if the new cryptographic module 308 has been registered, the cryptographic module 308 using the risky cryptographic method has been deleted, a bug has been found in the existing cryptographic module 308 and so this module 308 and the implemented cryptographic module portion 153 in which this module 308 is being executed have been updated, or cryptographic module evaluation has been changed to accommodate an increase in processing speed of a computing machine, updating information stored in the cryptographic module DB 353 or the cryptographic module evaluation DB 354 in the cryptographic module management server apparatus 350 and then periodically transmitting this updated information of the cryptographic package 307 to the cryptographic client apparatus 150 at a fixed period or in response to a request from the cryptographic client apparatus 150, thereby notifying that the cryptographic module management server apparatus 350 is transmitting the new cryptographic module 308 or that the existing implemented cryptographic module portion has been put out of service.

Figure 2:
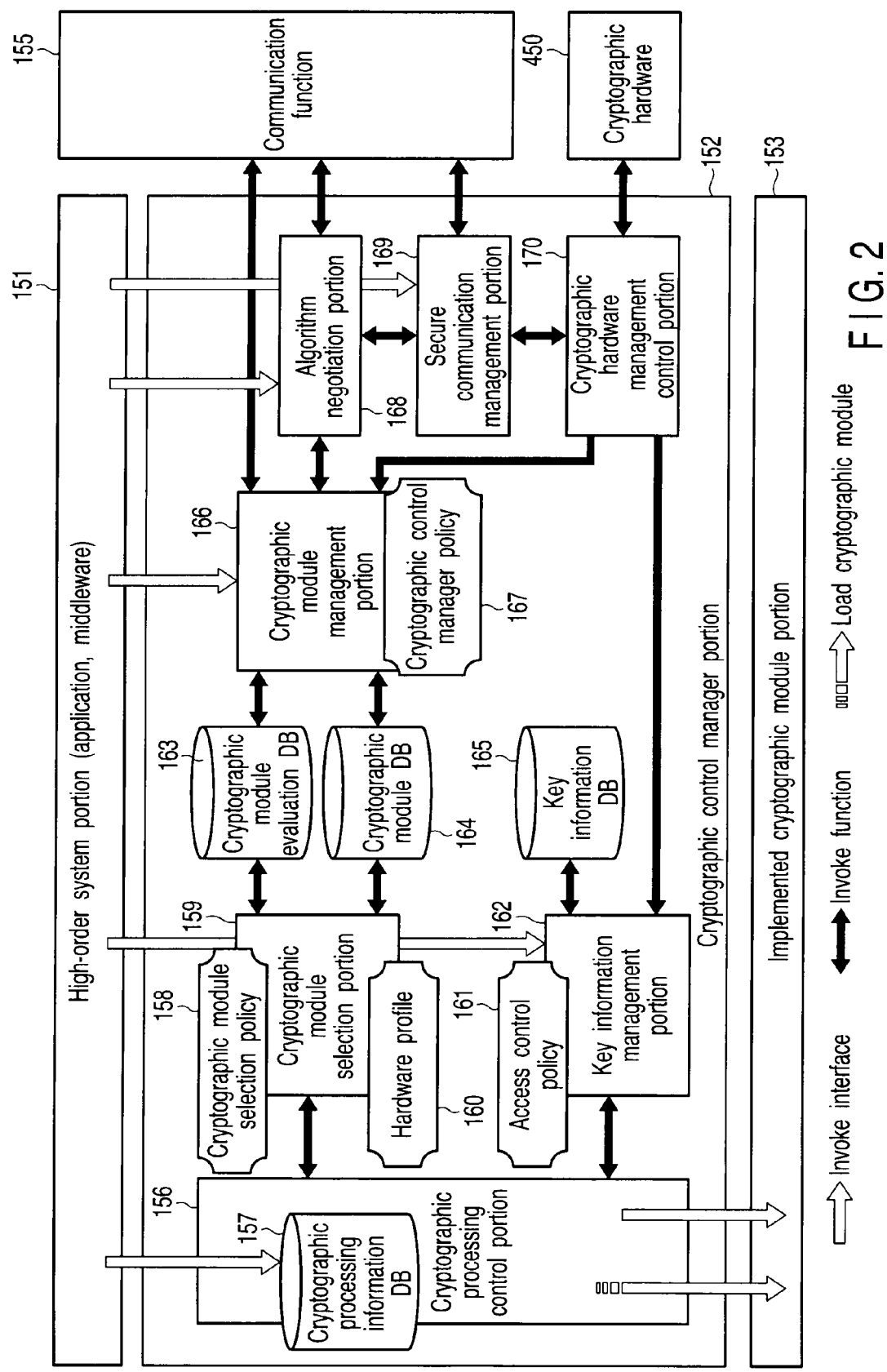
FIG. 2 is a block diagram of a constitution of a cryptographic client apparatus according to the same embodiment.

FIG. 2 is a detailed constitutional diagram of the cryptographic client apparatus 150. The cryptographic control manager portion 152 is constituted of a cryptographic processing control portion 156 having a cryptographic processing information DB 157, a cryptographic module selection portion 159 having a cryptographic module DB 164, a cryptographic module evaluation DB 163, a cryptographic module selection policy 158, and a hardware profile 160, a key information management portion 162 having a key information DB 165 and an access control policy 161 in which an access control policy for this key information DB 165 has been described, a cryptographic module management portion 166 having a cryptographic control manager policy 167, a cryptographic hardware management control portion 170 communicating with the cryptographic hardware portion 450, a communicating function 155 communicating with the outside, an algorithm negotiation portion 168 linked up with the communicating function 155, and a secure communication management portion 169 linked up with the communicating function 155.

The cryptographic processing control portion 156 performs key generation processing, key registration processing, and cryptographic processing when cryptographic processing has been invoked by the high-order system portion 151.

The cryptographic module DB 164 is a storage portion that stores the cryptographic modules 308 received from the cryptographic module management server apparatus 350.

The cryptographic module evaluation DB 354 is a storage portion that stores the cryptographic module evaluation description files 309 received from the cryptographic module management server apparatus 350.

The cryptographic module selection portion 159 selects the most appropriate cryptographic module 308 from among those stored in the cryptographic module DB 164 based on the condition information on the cryptographic module including a cryptographic category such as encryption or signature generation, the maker that created the cryptographic module 308, information of hardware on which the cryptographic module 308 operates, and evaluation information of the cryptographic module which has been input from the high-order system portion 151. Actually, such a cryptographic module 308 is selected as to match the hardware profile 160 in which the hardware information of the cryptographic client apparatus 150 has been described and also conform to a cryptographic module selection policy 158 in which a policy of a user of the cryptographic client apparatus 150 has been described.

The hardware profile 160 refers to information containing, for example, an architecture of the CPU of the cryptographic client apparatus 150, a CPU clock signal, and an amount of a memory installed. The cryptographic module selection policy 158 refers to information including, for example, a condition which the user would like to prefer to the others if a plurality of cryptographic modules have been selected based on the input conditions, the maker of a cryptographic module which the user would like to prefer in utilization, an encryption method of which the user would like to prohibit the use.

In such a manner, the cryptographic module selection portion 159 references input information from the high-order system portion 151, the hardware profile 160, and the cryptographic module selection policy 158 to thereby select the cryptographic module 308 that matches the input information. If the cryptographic module selection portion 159 has uniquely selected the cryptographic module 308, the selected cryptographic module 308 is taken out of the cryptographic module DB 164. If the cryptographic module selection portion 159 could not uniquely select the cryptographic module 308, it outputs an error.

The key information management portion 162 stores data into and reads data from the key information DB 165, such as information including key information and encryption method parameter information which are specified when invoking the implemented cryptographic module portion 153. If the number of pieces of the key information or the encryption method parameter information to be specified is not one, the key information management portion 162 associates the plurality of information pieces into one piece so that such information can be taken out, and then registers such information in the key information DB 165. Further, when taking out key information or encryption method parameter information of the key information DB 165, the key information management portion 162 controls access to the key information from the plurality of high-order systems 151 in accordance with the cryptographic module selection policy 158.

The cryptographic module management portion 166 establishes communication with the cryptographic module management server apparatus 350 via the communicating function 155, to receive the cryptographic packages 307, etc. in accordance with the procedures of initially registering, delivering and updating cryptographic modules. When receiving the cryptographic packages 307, etc. from the cryptographic module management server apparatus 350, the cryptographic module management portion 166 performs processing in accordance with the contents of the cryptographic control manager policy 167. The contents of the cryptographic control manager policy 167 include, for example, the following five items. The first item is permitted/unpermitted server authentication in communication with the cryptographic module management server apparatus 350. The second item is permitted/unpermitted encryption of the cryptographic package 307, etc. at the time of reception thereof from the cryptographic module management server apparatus 350. The third item is permitted/unpermitted addition of a message authentication code (MAC) at the time of reception of the cryptographic package 307 or the like from the cryptographic module management server apparatus 350. The fourth item is permitted/unpermitted verification of an authentication code of the received cryptographic package 307, etc. The fifth item is setting information about permitted/unpermitted periodical updating of the cryptographic packages 307 stored in the cryptographic module evaluation DB 163 and the cryptographic module DB 164, periodical updating that indicates an update frequency, etc.

The cryptographic hardware managing control portion 170 establishes communication with the cryptographic hardware portion 450, to receive the cryptographic packages 307 from the cryptographic module management server apparatus 350 in accordance with the procedure of initial registration of cryptographic modules. When the cryptographic package 307 is being received, if it itself has been encrypted, it is decrypted by the cryptographic hardware portion 450. Further, if addition of a message authentication code to the cryptographic module 308 has been detected, the cryptographic hardware portion 450 detects a falsification in the cryptographic module 308.

The algorithm negotiation portion 168 is linked up with the communicating function 155, to negotiate an encryption method to be utilized in a secure communication session and another to be utilized in establishment thereof before the secure communication session is established between two cryptographic client apparatuses.

The secure communication management portion 169 is linked up with the communication function 155, to establish a secure communication session with other cryptographic client apparatuses 150. When establishing a secure session, the secure communication management portion 169 shares a session key after an encryption method to be utilized in a communication session and another to be utilized in establishment thereof have been determined by the algorithm negotiation portion 168. After the secure communication session has been established, the session key is utilized in accordance with the determined encryption method, to enable adding an authentication code with which to encrypt communication data or make it tamper-proof. Further, the secure communication management portion 169 makes it possible to hold a once established communication session so that it can be used again within a constant lapse of time.

Figure 3:
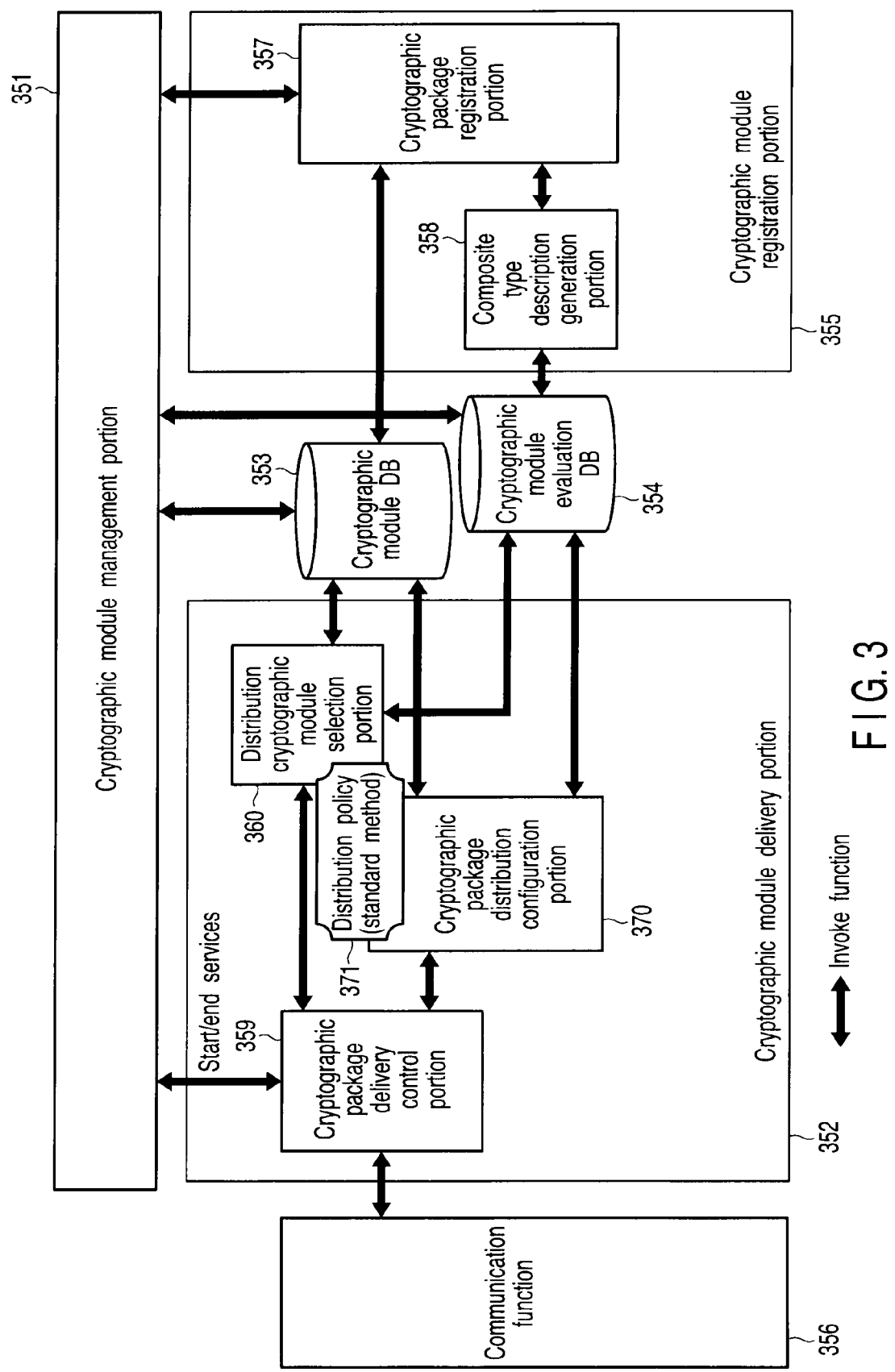
FIG. 3 is a block diagram of a constitution of a cryptographic module management server apparatus according to the same embodiment.

FIG. 3 is a detailed constitutional diagram of the cryptographic module management server apparatus 350. The cryptographic module management server apparatus 350 is constituted of the cryptographic module DB 353, the cryptographic module evaluation DB 354, the cryptographic module management portion 351 that performs processing such as reading and updating of information stored in the cryptographic module DB 353 and the cryptographic module evaluation DB 354, the cryptographic module registration portion 355 that registers information in the cryptographic module DB 353 and the cryptographic module evaluation DB 354, and the cryptographic package sending portion 352 that delivers cryptographic modules to the cryptographic client apparatus 150.

The cryptographic module DB 353 is a database that stores the cryptographic modules 308 to be stored beforehand or entered by the user.

The cryptographic module evaluation DB 354 is a database that stores the cryptographic module evaluation description files 309 to be stored beforehand or entered by the user.

The cryptographic module management portion 351 includes an interface with which to serve the user of the cryptographic module management server apparatus 350 by searching the cryptographic module DB 353 and the cryptographic module evaluation DB 354 for the cryptographic modules 308 and the cryptographic packages 307 stored therein, displaying the contents of the cryptographic module evaluation portion, displaying a list of cryptographic modules managed, updating the existing cryptographic modules, deleting the existing cryptographic modules, registering new cryptographic modules, and activating/deactivating the cryptographic package sending portion. When registering a new cryptographic module, the cryptographic module management portion 351 makes a request to the cryptographic module registration portion 355 for registration thereof.

The cryptographic module registration portion 355 includes a cryptographic package registration portion 357 and a composite type description generation portion 358.

The cryptographic package sending portion 352 includes a cryptographic package delivery control portion 359, a cryptographic package distribution configuration portion 370 having a distribution policy 371, and a distribution cryptographic module selection portion 360 having the distribution policy 371. The cryptographic package sending portion 352 conducts wait services to interpret a request from the cryptographic client apparatus 150 and perform the three procedures of initially registering, delivering, and updating a cryptographic module. Further, the wait services include recording logs of the processing contents.

The distribution cryptographic module selection portion 360 selects an appropriate cryptographic module 308 to be delivered, based on the three procedures of initially registering, delivering, and updating cryptographic modules and a request from the cryptographic client apparatus 150. In the case of the initial registration of a cryptographic module, the cryptographic module 308 to be delivered is prescribed as being indispensable, thus providing an encryption method described in the distribution policy 371.

Based on a cryptographic module 308 selected by the distribution cryptographic module selection portion 360, the cryptographic package distribution configuration portion 370 performs configuring processing to convert the cryptographic module 308 and a cryptographic module evaluation description file 309 that corresponds to the cryptographic module 308 into a format that can be distributed as a cryptographic package 307, according to the distribution policy 371. In the distribution policy 371, for example, the following four items are described.

The first item is permitted/unpermitted encryption of the cryptographic package 307 at the time of distribution thereof. The second item is a method of encrypting the cryptographic package 307. The third item is permitted/unpermitted addition of a message authentication code at the time of distribution of the cryptographic package 307. The fourth item is a method of encrypting a message authentication code for the cryptographic package 307.

In the configuring processing which is performed by the cryptographic package distribution configuration portion 370, contents stored in the cryptographic module evaluation DB 354 are generated in a specific format as a cryptographic module evaluation description file 309, to which file 309 an authentication code is added so that the distribution of this code to a cryptographic package 307 may be certified by the cryptographic module management server apparatus 350 and combined with a cryptographic module 308 into the cryptographic package 307.

Further, the cryptographic package distribution configuration portion 370 may integrate into one cryptographic package a cryptographic module 308 in which a plurality of cryptographic modules are combined and cryptographic module evaluation description files 309 that correspond to the plurality of cryptographic modules 308 respectively. Further, in the configuring processing performed by the cryptographic package distribution configuration portion 370, according to a cryptographic control manager policy of the cryptographic client apparatus 150 and a distribution policy 371 of the cryptographic module management server apparatus 350, a cryptographic package 307 is encrypted and a message authentication code is added thereto and, for these purposes, a key is generated and managed.

Second Embodiment

In contrast to the first embodiment that has been described with reference to a case where the cryptographic client apparatus processes the selection of an optimal encryption method, in the second embodiment, an optimal encryption method is selected under the initiative of the cryptographic module management server apparatus. That is, a cryptographic module delivery system shown in FIG. 4 employs a server linkage mechanism in which a module selection policy storage portion 110 manages and utilizes result information of an encryption method selected by a cryptographic module management server apparatus 1350. In particular, if the module selection policy storage portion 110 has a poor calculating capability, the cryptographic module management server apparatus 1350 can assist in calculation, thereby improving the response performance in a cryptographic client apparatus 1100.

Specifically, the cryptographic module management server apparatus 1350 selects an optimal cryptographic module 308 in response to a request from a high-order system portion 1151, the result of which selection is received by a cryptographic control manager portion 1152 in the cryptographic client apparatus 1100, while a relationship between conditions of that request and the optimal cryptographic module 308 is managed by a cryptographic information storage portion 1600 in this apparatus. Based on the relationship between a request from the high-order system portion 151 and an optimal cryptographic module 308 for this request, the cryptographic control manager portion 1152 performs processing that matches a cryptographic processing control request from the high-order system portion 151. Therefore, in contrast to the first embodiment, the cryptographic client apparatus 1100 need not necessarily manage all the selecting functions of a cryptographic module 308 or a cryptographic package 307 required to select the cryptographic module 308 or receive information from the cryptographic module management server apparatus 1350.

FIG. 4 is a block diagram outline of a constitution of a cryptographic module delivery system according to the second embodiment of the invention. The present system includes at least one cryptographic client apparatus 1100, at least one cryptographic hardware unit 1450, and the cryptographic module management server apparatus 1350. The cryptographic hardware 1450 is the same as that in the first embodiment. Note that a plurality of the cryptographic hardware units 1450 may be connected to each of the cryptographic client apparatuses 1100. Also, the cryptographic hardware 1450 may be mounted in the cryptographic client apparatus 1100.

Figure 5:
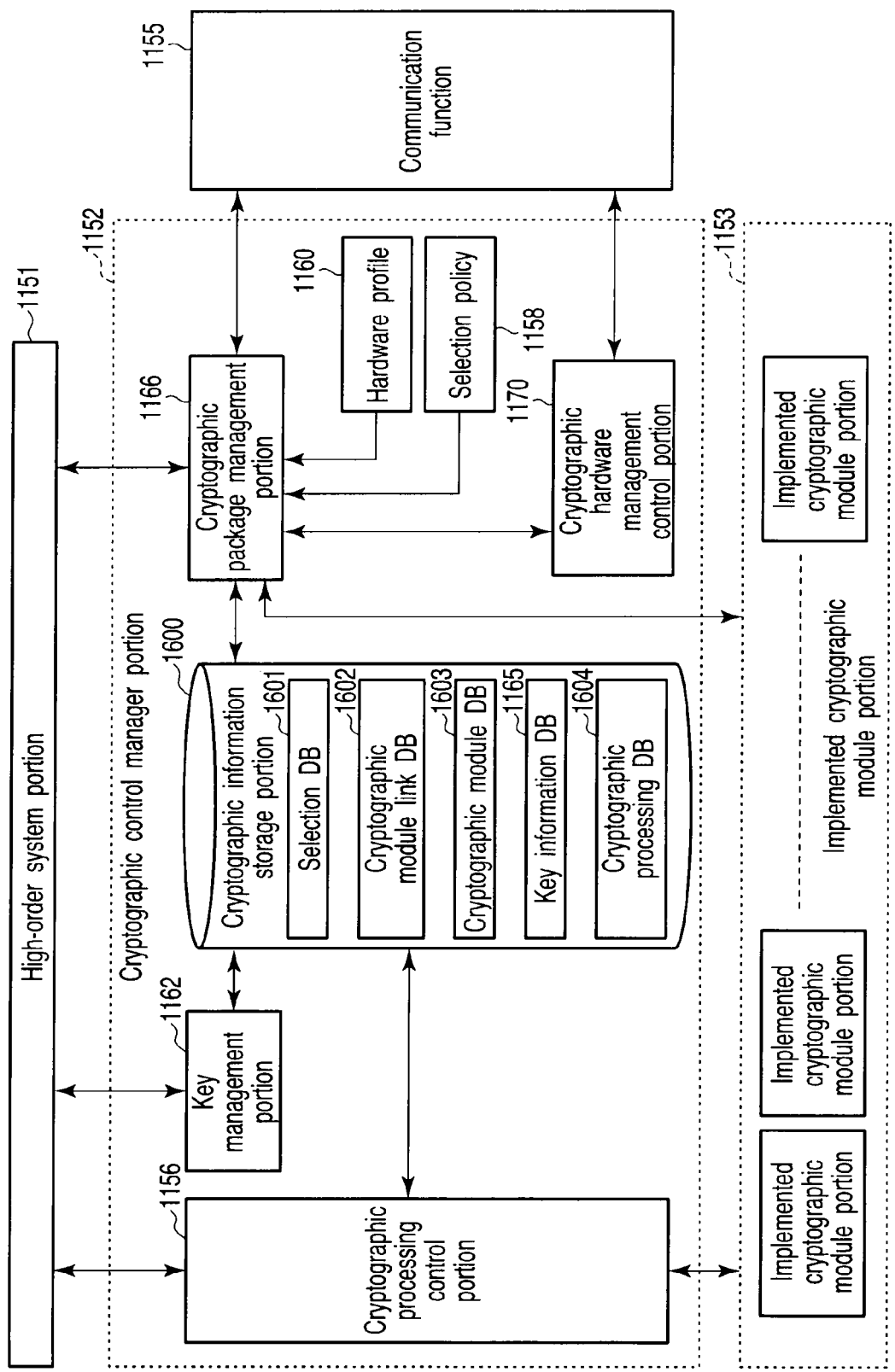
FIG. 5 is a block diagram of a constitution of a cryptographic client apparatus according to the same embodiment.

FIG. 5 is a block diagram of a constitution of the cryptographic client apparatus 1100. The cryptographic client apparatus 1100 includes the high-order system portion 1151, the cryptographic control manager portion 1152, an implemented cryptographic module portion 1153, and a communication function 1155. Further, a selection policy 1158 is a file in which security, a processing speed, and priority information of resources are set. The high-order system portion 1151 and the implemented cryptographic module portion 1152 have the same constitutions and functions as those in the first embodiment.

The cryptographic control manager portion 1152 includes a cryptographic processing control portion 1156, a key management portion 1162, a cryptographic information storage portion 1600, a cryptographic package management portion 1166, and a cryptographic hardware management control portion 1170.

The cryptographic processing control portion 1156 have a function to accept a cryptographic processing control request containing cryptographic processing conditions from the high-order system portion 1151, a function to specify a cryptographic module 1153 linked to the cryptographic processing conditions by referencing the cryptographic information storage portion 1600, a function to make a request to the implemented cryptographic module portion 1153 for cryptographic processing according to a cryptographic processing performing timing, a function to issue a cryptographic processing ID for this cryptographic processing, associate it with information about this cryptographic processing, and store it in the cryptographic information storage portion 1600, and a function to output to the high-order system portion 1151 the result of the cryptographic processing from the implemented cryptographic module portion 1153 and the cryptographic processing ID about this cryptographic processing.

The key management portion 1162 has a function to register, delete, acquire, search for, and update key information with a key information DB 1165 in the cryptographic information storage portion 1600 in response to a request from the high-order system portion 1151, a function to issue a key ID if a cryptographic key has been registered normally, associate the key ID with information about this registration processing, and store it in the cryptographic information storage portion 1600, and a function to output to the high-order system portion 1151 the result of each of the processing units including the cryptographic processing ID and the key ID according to the circumstances.

The cryptographic information storage portion 1600 has a function to store a selection DB 1601, a cryptographic module link DB 1602, a cryptographic module DB 1603, the key information DB 1165, and a cryptographic processing DB 1604. Further, the cryptographic information storage portion 1600 may be assumed to have a function to control and manage those DBs of the cryptographic information storage portion 1600 in response to requests from the key management portion 1162, the cryptographic processing control portion 1156, and the cryptographic package management portion 1166.

The selection DB 1601 has such a data structure as shown in FIG. 6. The cryptographic module link DB 1602 has such a data structure as shown in FIG. 7. The cryptographic module DB 1603 has such a data structure as shown in FIG. 8. The key information DB 1165 has such a data structure as shown in FIG. 9. The cryptographic processing DB 1604 has such a data structure as shown in FIG. 10. FIG. 11 shows a logical composition between the databases of the cryptographic information storage portion 1600.

The cryptographic package management portion 1166 has the following functions.

First, the cryptographic package management portion 1166 has a function to register in the cryptographic information storage portion 1600 the information of an algorithm ID of a selected cryptographic package 307, a cryptographic module evaluation description ID, a cryptographic module ID, and a recommended key length which are obtained by transmitting information including selection conditions, a selection policy, and a hardware profile which have been input from the high-order system portion 1151 to the cryptographic module management server apparatus 1350 via the communication function 1155.

Further, the cryptographic package management portion 1166 has a function to perform a cryptographic package initial registration protocol on the cryptographic module management server apparatus 1350 via the communication function 1155 by using as an input final initial registration date and a final initial registration domain based on a request input from the high-order system portion 1151 so that the minimum required number of cryptographic packages 307 may be downloaded from the cryptographic module management server apparatus 1350 and register them in the cryptographic information storage portion 1600.

Further, the cryptographic package management portion 1166 has a function to transmit to the cryptographic module management server apparatus 1350 via the communication function 1155 the information including selection conditions, a selection policy, a hardware profile, and a list of the cryptographic packages 307 to be held in a terminal which have been input from the high-order system portion 1151 so that the entity of the cryptographic packages 307 and its attendant information (algorithm ID, cryptographic module evaluation description ID, and cryptographic module ID) which have been selected in this cryptographic module management server apparatus 1350 may be acquired and register them in the cryptographic information storage portion 1600.

Further, the cryptographic package management portion 1166 has a function to perform policy selection instead of the cryptographic control manager portion 1152 at the time of occurrence of registration or updating of the destination of an update notification from the cryptographic module management server apparatus 1350.

Further, the cryptographic package management portion 1166 has a function to update a link between the entity of a cryptographic package 307 and its selection policy and link which are held in the cryptographic control manager portion 1152 in cooperation with the cryptographic module management server apparatus 1350 via the communication function 1155 based on the contents requested by the high-order system portion 1151 and a final update notification identifier held in the cryptographic control manager portion 1152.

Further, the cryptographic package management portion 1166 has a function to delete associations among the databases of the cryptographic information storage portion 1600 which have been linked to a cryptographic package 307 requested from the high-order system portion 1151 by deleting the entity of this cryptographic package 307 from the cryptographic information storage portion 1600.

Further, the cryptographic package management portion 1166 has a function to transmit to the cryptographic module management server apparatus 1350 via the communication function 1155 the information including a transfer destination domain information, a hardware profile, and a list of cryptographic packages 307 to be held in the relevant apparatus which have been input from the high-order system 1151 so that the information of the cryptographic packages subject to take-out control which have been selected by the cryptographic module management server apparatus 1350 may be acquired and delete those target packages from the cryptographic client apparatus 1100.

The cryptographic management control portion 1170 has a function to conduct communication control on cryptographic hardware via the communication function 1155 in response to a request from each portion in the cryptographic control manager portion 1152.

The communication function 1155 has such a function that the cryptographic package management portion 1166 and the hardware management control portion 1170 can mutually communicate with their partner communication apparatus or cryptographic hardware.

Figure 12:
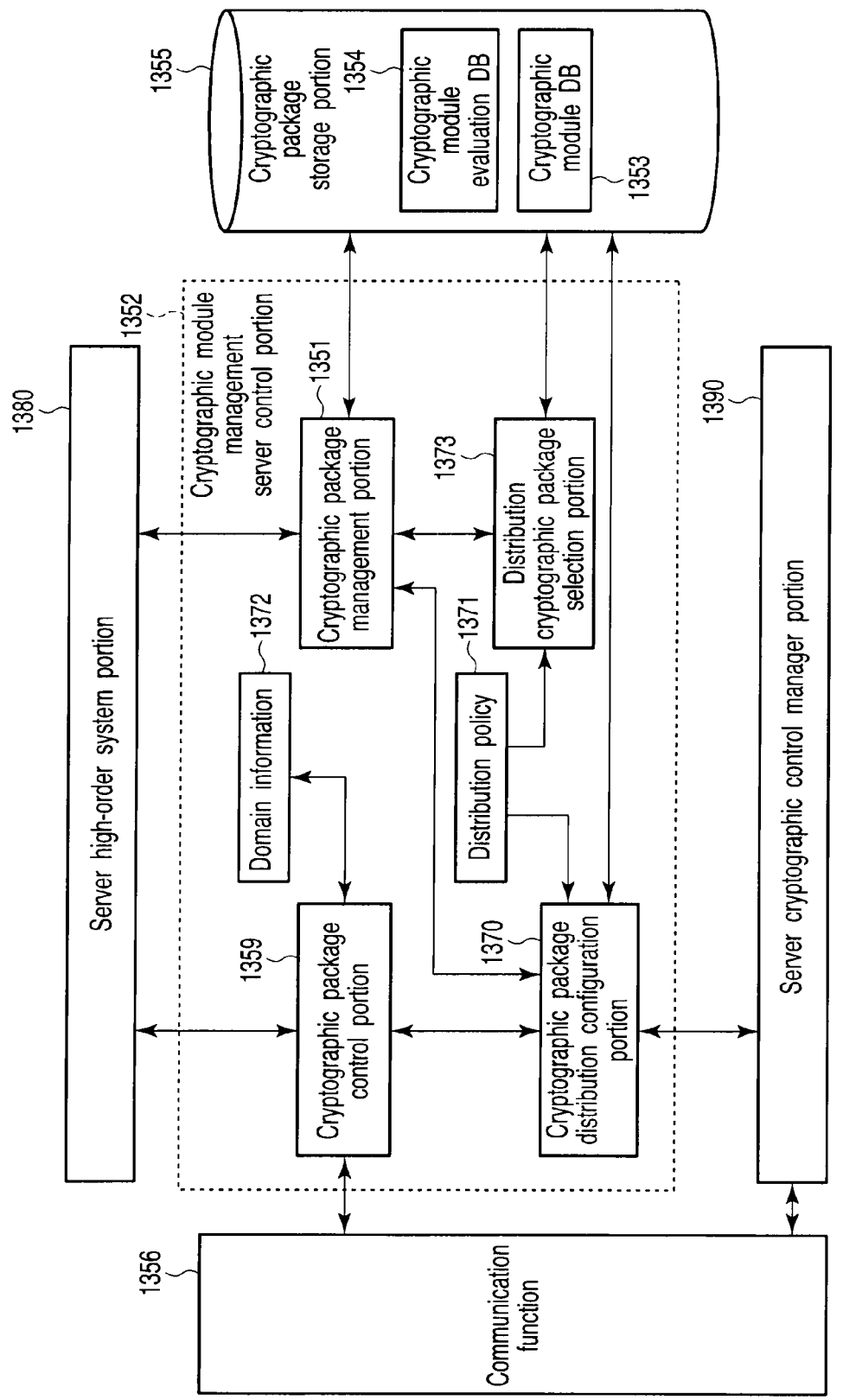
FIG. 12 is a block diagram of a constitution of a cryptographic module management server apparatus according to the same embodiment.

FIG. 12 is a functional block diagram of a constitution of the cryptographic module management server apparatus 1350. The cryptographic module management server apparatus 1350 includes a server high-order system portion 1380, a communication function 1356, a cryptographic module management server control portion 1352, a cryptographic package storage portion 1355, and a server cryptographic control manager portion 1390.

The server high-order system portion 1380 has the same functions as the server high-order system portion 1380 of the cryptographic client apparatus 1100 and, additionally, a function to transmit to the cryptographic module management server control portion 1352 a control request concerning cryptographic module management from a system manager.

The communication function 1356 has such a function that the cryptographic module management server control portion 1352 and the server cryptographic control manager portion 1390 can mutually communicate with their partner communication apparatus, cryptographic hardware, or a simulator that simulates the operations of this cryptographic hardware.

The cryptographic module management server control portion 1352 includes a cryptographic package control portion 1359, a cryptographic package management portion 1351, a cryptographic package distribution configuration portion 1370, and a distribution cryptographic package selection portion 1373.

The cryptographic package control portion 1359 has a function to register a cryptographic package 307 in response to a request from the server high-order system portion 1380, a function to update the already registered cryptographic package in response to a request from the server high-order system portion 1380, a function to verify a vendor-certified authentication code required to confirm the source of the relevant cryptographic package at the time of distributing the cryptographic package from the vendor, a function to generate a composite type cryptographic module evaluation description portion by combining a plurality of stand-alone type cryptographic module evaluation description portions and a plurality of composite type cryptographic module evaluation description portions, a function to search the cryptographic module DB 1355 for cryptographic packages 307 registered therein and acquire a list of them, a function to delete a cryptographic module 308 and the relevant cryptographic package 307 from the cryptographic module DB 1355 in response to a request from the server high-order system portion 1380, and a function to output logs for registration, update, and deletion processing conducted on the cryptographic package storage portion 1355.

The cryptographic package management portion 1351 has a function to concurrently perform processing on control requests from a plurality of the cryptographic client apparatuses 1100, a function to perform cryptographic package 370 initial registration processing, delivery processing, update processing, selection processing, and update notification processing and cryptographic module management domain transfer processing, a function to establish a communication path whose security has been protected between the cryptographic client apparatus 1100 and the cryptographic module management server apparatus 1350, a function to manage the situation of the cryptographic client apparatus present in a domain managed by this cryptographic module management server apparatus 1350, and a function to generate logs for cryptographic package 370 initial registration processing, delivery processing, update processing, selection processing, and update notification processing and cryptographic module management domain transfer processing.

The cryptographic package distribution configuration portion 1370 has a function to acquire a cryptographic package 307 selected by the distribution cryptographic package selection portion 1373 from the cryptographic module DB 1355, a function to configure the data of each description item stored in the cryptographic module DB 1355 into a cryptographic module evaluation description format such as XML and output such data, a function to generate a key to be used in security communication by the cryptographic package control portion 1359 by making a request to the server cryptographic control manager portion 1390 for processing that corresponds to a security method specified for the key, a function to manage information about the key based on information including an ID of the cryptographic client apparatus 1100 and the security method, and a function to perform security processing on data secrecy and data authentication of information to be transmitted to the cryptographic client apparatus 1100 from the cryptographic module management server apparatus 1350 in accordance with the security method and a security level defined in a distribution policy of the cryptographic module management server apparatus 1350.

The distribution cryptographic package selection portion 1373 has a function to perform initial registration decision, encryption method selection, and cryptographic package selection in cryptographic package initial registration processing, a function to perform delivery decision and cryptographic package selection in cryptographic package delivery processing, a function to perform delivery decision in cryptographic package update processing, a function to perform updated cryptographic module list acquisition and cryptographic package selection in the cryptographic package update processing, a function to perform a selection decision and cryptographic package selection in cryptographic package selection processing, a function to perform movement decision and domain movement processing information generation in cryptographic module management domain transfer processing, and a function to search the cryptographic package storage portion for a cryptographic package that meets the selection conditions, selection policy, and hardware policy.

The cryptographic module DB 1355 includes a cryptographic module DB 1353 that records and manages the cryptographic modules 308 which have been registered and a cryptographic module evaluation DB 1354 that records and manages the cryptographic module evaluation description files 309.

The server cryptographic control manager portion 1390 has the almost the same functions as the cryptographic control manager portion 1152 in the cryptographic client apparatus 1100 and, additionally, a function to be linked with the cryptographic module management server control portion 1352 for the purpose of performing cryptographic asset management control in the cryptographic module management server apparatus 1350 and secure authenticated communication with any other communication apparatus.

Next, the following will describe a cryptographic module management apparatus that, in the case of using a composite cryptographic module composed of cryptographic modules in the above-described cryptographic module delivery system, calculates an evaluation value of the composite cryptographic module, selects a cryptographic module that matches a selection request by using this calculation result, and outputs the selected module.

Third Embodiment

The following will describe the third embodiment with reference to the drawings.

FIG. 13 is a block diagram outline of the constitution of a cryptographic module management apparatus according to the third embodiment of the invention. A cryptographic module management apparatus 1 includes a cryptographic module meta-information storage portion 101, a cryptographic module storage portion 102, a cryptographic module meta-information search portion 103, a storage portion 104, a composite type cryptographic module evaluation calculation portion 105, a cryptographic module selection portion 106, and a cryptographic module acquisition portion 107. This cryptographic module management apparatus 1 selects a cryptographic module in response to a selection request from, for example, a terminal device connected in a wireless or wired manner and output the selected cryptographic module to the terminal device that has sent this selection request.

The selection request from a terminal device may come in the form of usage with a cryptographic method or a request which occurs corresponding to an environment in which cryptographic processing is to be performed, such as "need of a secure digital signature generation module", "need of a high-speed common key cryptographic module", or "need of a hash function module which requires a small amount of memory used", for example. This selection request includes at least the category information of cryptographic modules such as a common key encryption and a digital signature and may further include conditions such as security, a speed, and a memory amount to be used, restriction information such as an executable platform, the maximum input length, and the maximum key length, and identification of a vendor that has created a cryptographic module.

The cryptographic module meta-information storage portion 101 stores cryptographic module meta-information which attends a cryptographic module. The cryptographic module storage portion 102 stores a plurality of cryptographic modules. The cryptographic module meta-information search portion 103 searches the cryptographic module meta-information storage portion 101 for cryptographic module meta-information based on the category information of a cryptographic module contained in a selection request from the terminal device and writes the obtained cryptographic module meta-information into the storage portion 104. The storage portion 104 stores the results of the search by the cryptographic module meta-information search portion 103 and results of calculations by the composite type cryptographic module evaluation calculation portion 105.

If associated cryptographic module category information is contained in cryptographic module meta-information specified by the cryptographic module selection portion 106, the composite type cryptographic module evaluation calculation portion 105 searches for the cryptographic module meta-information of associated cryptographic modules by using the cryptographic module meta-information search portion 103 and specifies the cryptographic module meta-information of each of the associated cryptographic modules obtained as a result of the search to thereby recursively invoke itself (composite type cryptographic module evaluation calculation portion 105), thereby generating composite type cryptographic module evaluation information based on the resultantly obtained evaluation information of the associated cryptographic modules and derivation method information contained in the cryptographic module meta-information of these cryptographic modules.

Further, if the associated cryptographic module category information is not contained in cryptographic module meta-information of a cryptographic module specified by the cryptographic module selection portion 106, the composite type cryptographic module evaluation calculation portion 105 generates evaluation information of this cryptographic module as composite type cryptographic module evaluation information.

The cryptographic module selection portion 106 invokes the composite type cryptographic module evaluation calculation portion 105 based on the cryptographic module meta-information of a cryptographic module specified by the cryptographic module meta-information search portion 103 in response to a selection request, thereby obtaining composite type cryptographic module evaluation information. Based on this obtained composite type cryptographic module evaluation information, the cryptographic module selection portion 106 selects a cryptographic module. In this selection, for example, such a cryptographic module is selected as to have the highest mark in the composite type cryptographic module evaluation information output from the composite type cryptographic module evaluation calculation portion 105.

Based on the cryptographic module name of a cryptographic module specified by the cryptographic module selection portion 107, the cryptographic module acquisition portion 107 reads the cryptographic module from the cryptographic module storage portion 106 and outputs it to a request source (e.g., terminal device) that has issued a selection request.

Figures 14, 15:
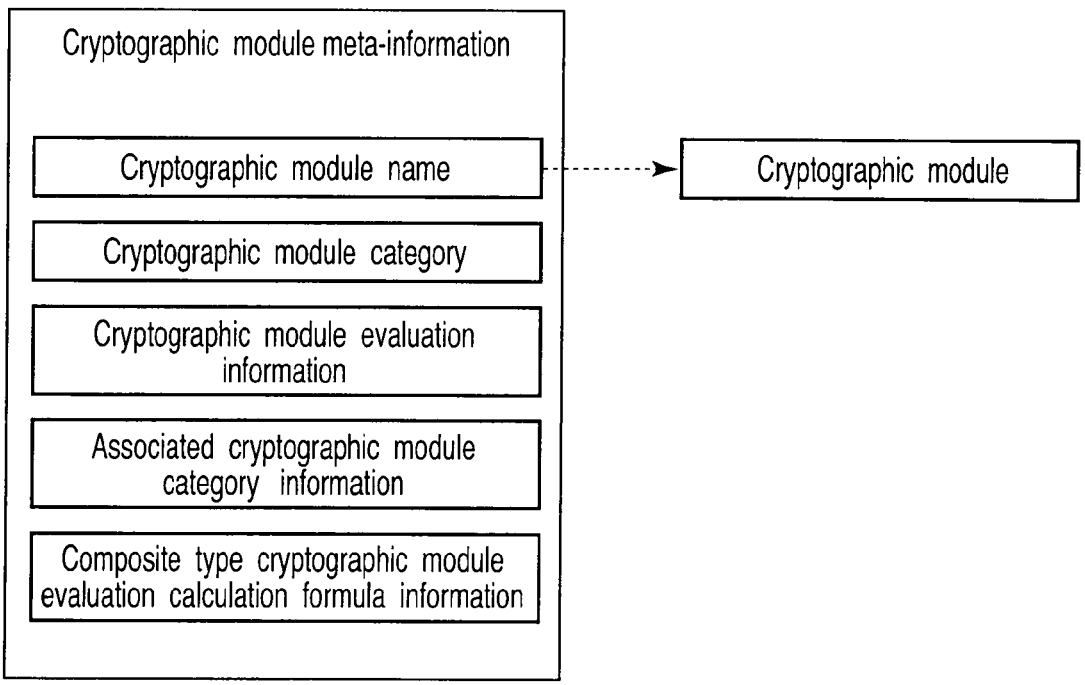
FIG. 14 shows one example of cryptographic module meta-information according to the same embodiment.
FIG. 15 shows one example of cryptographic module evaluation information according to the same embodiment.

FIG. 14 shows one example of cryptographic module meta-information. This cryptographic module meta-information relates to each cryptographic module and is created by a vendor who has created the cryptographic module or a cryptographic module evaluation engine. The cryptographic module meta-information is registered in the cryptographic module meta-information storage portion 101 of the cryptographic module management apparatus 1 together with a cryptographic module beforehand so that the cryptographic module meta-information and the cryptographic module may be stored in the cryptographic module meta-information storage portion 101 and the cryptographic module storage portion 102, respectively.

This cryptographic module meta-information includes a cryptographic module name, a cryptographic module category (which corresponds to the above-described category information), and cryptographic module evaluation information (which corresponds to the above-described evaluation information). The cryptographic module name (which corresponds to the above-described cryptographic module identification information) is information to identify the relevant cryptographic module. The cryptographic module category is information to represent a category of cryptographic processing that can be performed by the relevant cryptographic module. Note that the cryptographic module categories include, for example, a common key encryption, a public key encryption, a digital signature, a hash function, pseudo-random number generation, etc. The cryptographic module evaluation information indicates results of evaluation of the relevant cryptographic module, giving numeric representations, for example, marks of cryptographic module security, a speed, an amount of memory used, etc. This information may further describe information of a platform that can be executed by the relevant cryptographic module and usage restrictions such as a maximum input length and a maximum key length.

FIG. 15 shows one example of the cryptographic module evaluation information. This cryptographic module evaluation information is stored beforehand in a condition where an evaluation item and an evaluation mark, which is the result of evaluation in terms of this evaluation item, are correlated with each other for each piece of cryptographic module meta-information. The evaluation items include, for example, security, a speed, an amount of memory used, etc., so that each of these evaluation items is correlated with a mark (e.g., 60, 20, or 30) corresponding to this evaluation item and stored. This evaluation mark is assumed to be calculated according to a predetermined calculating formula.

Further, if an associated cryptographic module is required to execute the relevant cryptographic module, the cryptographic module meta-information contains also associated cryptographic module category information that indicates a category to which that associated cryptographic module belongs. This "case in which an associated cryptographic module is required to execute a cryptographic module" may be, in other words, a case where the cryptographic module cannot perform cryptographic processing in a stand-alone mode. For example, in some cases, a cryptographic module such as an RSASSA cannot be executed unless it is combined with such cryptographic modules, etc. as to perform a hash function and pseudo-random number generation. In this case, the associated cryptographic method category information of cryptographic modules stores therein a category of a cryptographic module that needs to be combined with such modules as to perform a hash function and pseudo-random number generation, as associated cryptographic method category information.

Further, if the relevant cryptographic module requires an associated cryptographic module for its execution, the cryptographic module meta-information contains composite type cryptographic module evaluation calculating formula information (which corresponds to the above-described derivation method information) that indicates a method for deriving composite type cryptographic module evaluation information, which is evaluation information in a case where the relevant cryptographic module has been executed in a condition where it has been combined with this associated cryptographic module, based on the evaluation information set in the relevant cryptographic module and that set in this associated cryptographic module. This composite type cryptographic module evaluation calculating formula information is a calculating program that includes a composite type cryptographic module evaluation calculating formula which is used to calculate evaluation information in a case where those modules have been combined. Similarly to each piece of cryptographic module evaluation information, the composite type cryptographic module evaluation information gives numeric representations, for example, marks of security, a speed, an amount of memory used, etc. in a case where the relevant cryptographic module and this associated cryptographic module have been combined and executed, and may further contain information of a platform that can be executed by those cryptographic modules and usage restrictions such as a maximum input length and a maximum key length.

For example, in the case of calculating composite type cryptographic module evaluation information about security in a case where a cryptographic module to perform digital signature, a module to calculate a hash function, and a cryptographic module to generate a pseudo-random number have been combined, the composite type cryptographic module evaluation calculating formula information of the digital signature module contains the following pieces of information. That is, in the case of adding up an evaluated value indicative of security of the digital signature module and evaluated values indicative of security of each of categories of a hash function and pseudo-random number generation by using weighting factors w1, w2, and w3 respectively to provide an evaluated security value of the combination, the composite type cryptographic module evaluation calculating formula information describes the following calculating formula (1):

$$(\text{Evaluated security value of digital signature}) = w1 \times (\text{evaluated security value of digital signature module}) + w2 \times (\text{evaluated security value of hash function}) + w3 \times (\text{evaluated security value of pseudo-random generation}) \quad (1)$$

In this case, as the evaluated security value of a digital signature module, an evaluated value described in the cryptographic module meta-information of the module of this digital signature is substituted; and if evaluated values described in the cryptographic module meta-information of each of the hash function module and the pseudo-random number generation module to be combined or associated cryptographic modules to execute those cryptographic modules are further required, an evaluated security value of the hash function and that of the pseudo-random number generation serve as variables into which to substitute evaluated values calculated from the composite type cryptographic module evaluation calculating formula information described in those pieces of cryptographic module meta-information.

Further, this composite type cryptographic module evaluation calculating formula information contains the weighting factors w1, w2, and w3.

FIG. 16 is an explanatory diagram of cryptographic module meta-information by use of associated cryptographic method category information.

If cryptographic module meta-information A contains associated cryptographic method category information and this associated cryptographic method category information has category "pseudo-random number generation" set therein, a cryptographic module C which is attended by cryptographic module meta-information (e.g., cryptographic module meta-information C in this case) set to "pseudo-random number generation" as the cryptographic module category is one of the associated cryptographic modules. In this case, the cryptographic module meta-information A is of a higher order, while cryptographic module meta-information which contains set cryptographic module category information that agrees with the associated cryptographic method category information is of a lower order.

Further, in this case, if the cryptographic module meta-information C also contains associated cryptographic method category information and this associated cryptographic method category information is of the category of "hash function", a cryptographic module D which is attended by cryptographic module meta-information (cryptographic module meta-information D in this case) set to "hash function" as the cryptographic module category is one of the associated cryptographic modules. Note that in this case, the cryptographic module meta-information D contains no associated cryptographic method category information and, therefore, is the lowest-order cryptographic module meta-information against the cryptographic module meta-information A. In this case, the composite type cryptographic module evaluation calculating formula information is contained also in the cryptographic module meta-information C, describing the following calculating formula (2) for calculating composite type cryptographic module evaluation information about security for a combination of, for example, a module to calculate pseudo-random number generation and a module to calculate a hash function.

$$(\text{Evaluated security value of pseudo-random number generation}) = w4 \times (\text{evaluated security value of pseudo-random number generation module}) + w5 \times (\text{evaluated security value of hash function}) \quad (2)$$

As in the case of calculating formula (1), as the evaluated security value of pseudo-random number generation, an evaluated value described in the cryptographic module meta-information of the module of this digital signature is substituted; and if evaluated values described in the cryptographic module meta-information of each of the hash functions to be combined or associated cryptographic modules to execute the hash functions' cryptographic modules are further required, an evaluated security value of the hash function serves as a variable into which to substitute an evaluated value calculated from the composite type cryptographic module evaluation calculating formula information described in the cryptographic module meta-information of the hash functions. Further, this composite type cryptographic module evaluation calculating formula information contains the weighting factors w4 and w5.

Also, if cryptographic module meta-information A further contains associated cryptographic method category information different from "pseudo-random number generation" and this associated cryptographic method category information has a category "hash function" set therein, a cryptographic module B which is attended by cryptographic module meta-information (e.g., cryptographic module meta-information B in this case) set to "hash function" as the cryptographic module category is one of the associated cryptographic modules. In this case, the cryptographic module meta-information B contains no associated cryptographic method category information, so that there is no cryptographic module meta-information of a further lower order.

Next, calculations by the composite type cryptographic module evaluation calculation portion 105 will be further described with reference to FIG. 16.

For example, if a "secure digital signature generation module" is required on the side of a terminal device, a selection request containing category "digital signature" and evaluation item "security" to be selected is transmitted from the terminal device to the cryptographic module management apparatus 1. Then, if the cryptographic module meta-information search portion 103 has obtained, as its search result, the cryptographic module meta-information A of a cryptographic module A as a cryptographic module to which category "digital signature" has been set, the composite type cryptographic module evaluation calculation portion 105 reads associated cryptographic method category information of the cryptographic module meta-information A, so that the cryptographic module meta-information search portion 103 searches for cryptographic module meta-information in which this associated cryptographic method category information is described as a cryptographic module category. In this case, category "pseudo-random number generation" is described in the associated cryptographic method category information of the cryptographic method category information A, so that the cryptographic module meta-information search portion 103 obtains as its search result the cryptographic module meta-information C in which this category of "pseudo-random number generation" is described as the cryptographic module category.

If the cryptographic module meta-information C is found, the composite type cryptographic module evaluation calculation portion 105 decides whether this cryptographic module meta-information C contains associated cryptographic method category information. In this case, the associated cryptographic method category information is described, so that the composite type cryptographic module evaluation calculation portion 105 reads the associated cryptographic method category information from the cryptographic module meta-information C and uses the cryptographic module meta-information search portion 103 to thereby search for cryptographic module meta-information in which this associated cryptographic method category information is described as a cryptographic module category. In this case, category "hash function" is described in the associated cryptographic method category information of the cryptographic method category information C, so that the cryptographic module meta-information search portion 103 obtains, as its search result, the cryptographic module meta-information D in which this category of "hash function" is described as the cryptographic module category.

If the cryptographic module meta-information D is found, the composite type cryptographic module evaluation calculation portion 105 decides whether this cryptographic module meta-information D contains associated cryptographic method category information. In this case, no associated cryptographic method category information is contained, so that the composite type cryptographic module evaluation calculation portion 105 returns to a former step to further decide whether the associated cryptographic method category information of the cryptographic module meta-information C contains a category described therein. In this case, no further category other than "hash function" is described in the associated cryptographic method category information of the cryptographic module meta-information C, so that the composite type cryptographic module evaluation calculation portion 105 returns to a further former step to further decide whether the associated cryptographic method category information of the cryptographic module meta-information A contains a category described therein. In this case, category "hash function" other than "pseudo-random number generation" is described in the associated cryptographic method category information of the cryptographic module meta-information A, so that the cryptographic module meta-information search portion 103 is used to further search for cryptographic module meta-information in which "hash function" is described, as a cryptographic module category. In this case, as its search result, the cryptographic module meta-information B is obtained. In this case, the cryptographic module meta-information D of a hash function may be obtained instead which has already been found as a lower order module of pseudo-random number generation. If the cryptographic module meta-information B is found, the composite type cryptographic module evaluation calculation portion 105 decides whether this cryptographic module meta-information B contains associated cryptographic method category information. In this case, no associated cryptographic method category information is contained, so that it returns to a former step to further decide whether the associated cryptographic method category information of the cryptographic module meta-information A contains a category described therein. In this case, since no further category is described, the process ends searching for cryptographic module meta-information.

Subsequently, the composite type cryptographic module evaluation calculation portion 105 generates composite type cryptographic module evaluation information by using the cryptographic module pieces of meta-information pieces A, B, C, and D obtained as a result of the search.

First, the composite type cryptographic module evaluation calculation portion 105 uses the cryptographic module meta-information pieces C and D including the lowest order cryptographic module meta-information D, thereby generating composite type cryptographic module evaluation information of pseudo-random number generation. From among the cryptographic module evaluation information pieces of the cryptographic module meta-information C and D, the composite type cryptographic module evaluation calculation portion 105 reads an evaluated mark in an evaluation item that agrees with the evaluation item of "security" received by the cryptographic module meta-information search portion 103. In this case, for example, if the evaluated mark of "security" in the cryptographic module meta-information C is "40" and the evaluated mark of "security" in the cryptographic module meta-information D is "60", these marks are each read by the composite type cryptographic module evaluation calculation portion 105.

Next, composite type cryptographic module evaluation calculation portion 105 calculates composite type cryptographic module evaluation information in accordance with calculating formula (2) for evaluated security values of the pseudo-random number generation described in composite type cryptographic module evaluation calculating formula information of the cryptographic module meta-information C. In this case, if a W4 value of 0.3 and a W5 value of 0.5 are contained in the composite type cryptographic module evaluation calculating formula information, the composite type cryptographic module evaluation calculation portion 105 calculates 0.3×40+0.5×60 based on those formula and values as an evaluated security value of pseudo-random number generation, to obtain 42 as the calculation result of the evaluated security value of pseudo-random number generation. Note that this calculation result is an evaluated security value in a case where the cryptographic module meta-information C and the cryptographic module meta-information D are combined, so that for example if there is cryptographic module meta-information E of the hash function category different from the cryptographic module meta-information D, an evaluated security value of this cryptographic module meta-information E is used in the calculation in composite type cryptographic module evaluation calculating formula information of the cryptographic module meta-information C; therefore, even though cryptographic module meta-information belonging to the same category of "hash function" may come up with a different evaluation result in some cases.

If the result of security evaluation of pseudo-random number generation is obtained in the case where the cryptographic module meta-information C and the cryptographic module meta-information D are combined, the composite type cryptographic module evaluation calculation portion 105 calculates an evaluated security value of digital signature, which is an evaluated security value for the combination of the cryptographic module meta-information A higher in order than the cryptographic module meta-information C, by using the above-described calculated result of security evaluation of pseudo-random number generation, the cryptographic module meta-information A, and the cryptographic module meta-information B immediately under the meta-information A in order. In this case, the composite type cryptographic module evaluation calculation portion 105 calculates the evaluated security value of a digital signature by using the cryptographic module evaluation information (which is assumed to be 60 as one example) of the cryptographic module meta-information A, a calculated result 42 of the evaluated security value of pseudo-random number generation obtained by the above calculation, the cryptographic module evaluation information (which is assumed to be 50 as one example) of the cryptographic module meta-information B, and calculating formula (1), which provides the composite type cryptographic module evaluation calculating formula information of the cryptographic module meta-information A, which is higher in order than those pieces of information. In this case, if W1, W2, and W3 are described as being 0.7, 0.4, and 0.3 respectively in the composite type cryptographic module evaluation calculating formula information, the composite type cryptographic module evaluation calculation portion 105 calculates 0.7×60+0.4×50+0.3×42 as an evaluated security value of a digital signature based on such formula and values, thereby obtaining a calculated result of the evaluated security value of digital signature of 74.6.

Furthermore, the composite type cryptographic module evaluation calculation portion 105 uses the cryptographic module meta-information search portion 103 to thereby calculate composite type cryptographic module evaluation information also for all the combinations of pieces of information other than the cryptographic module meta-information pieces A, B, C, and D similarly. For example, if cryptographic module meta-information F in which "hash function" is described as the cryptographic module category is found by the cryptographic module meta-information search portion 103 other than the cryptographic module meta-information B, the composite type cryptographic module evaluation calculation portion 105 calculates composite type cryptographic module evaluation information also in a case where the cryptographic module pieces of meta-information A, F, C, and D are combined. In this case, the composite type cryptographic module evaluation calculation portion 105 calculates the composite type cryptographic module evaluation information by using the result of an evaluated security value of pseudo-random number generation obtained by a combination of cryptographic module evaluation information of the cryptographic module meta-information A, cryptographic module evaluation information of the cryptographic module meta-information F (which is assumed to be 20, for example), and the cryptographic module pieces of meta-information C and D and calculating formula (1), which provides the composite type cryptographic module evaluation calculating formula information of the cryptographic module meta-information A, which is higher in order than those pieces of information. That is, in this case, the composite type cryptographic module evaluation calculation portion 105 calculates 0.7×60+0.4×20+0.3×42, thereby obtaining a calculated result 62.6 of the evaluated security value of the combination.

If the composite type cryptographic module evaluation information has been obtained for all the combinations of the cryptographic module meta-information pieces thus found, the composite type cryptographic module evaluation calculation portion 105 outputs a suite of the information that indicates a combination of the cryptographic module meta-information pieces used in calculation of the composite type cryptographic module evaluation information and the obtained composite type cryptographic module evaluation information to the cryptographic module selection portion 106 for each of all the combinations of the pieces of cryptographic module meta-information. For example, in the above combination case, the information indicating that the cryptographic module meta-information pieces A, B, C, and D have been combined and information indicating that the composite type cryptographic module evaluation information for this combination is 74.6 are output to the cryptographic module selection portion 106.

Note that in a case where the cryptographic module meta-information D has been found rather than the cryptographic module meta-information B in calculation of the composite type evaluation information about an evaluated value of, for example, an amount of memory used and the composite type cryptographic module evaluation information is to be calculated of a combination of the cryptographic module meta-information pieces A, B, C, and D, if composite type cryptographic module evaluation calculating formula information similar to the above-described composite type cryptographic module evaluation information about security is described as the composite type cryptographic module evaluation calculating formula information of the cryptographic module meta-information A, the evaluated value of the amount of memory used by the cryptographic module meta-information D may be added redundantly, thus giving an inappropriate value of composite type cryptographic module evaluation. In this case, the composite type cryptographic module evaluation calculating formula information may have such a condition expression described therein that the evaluation information of the same cryptographic module need be not added redundantly.

Figure 17:
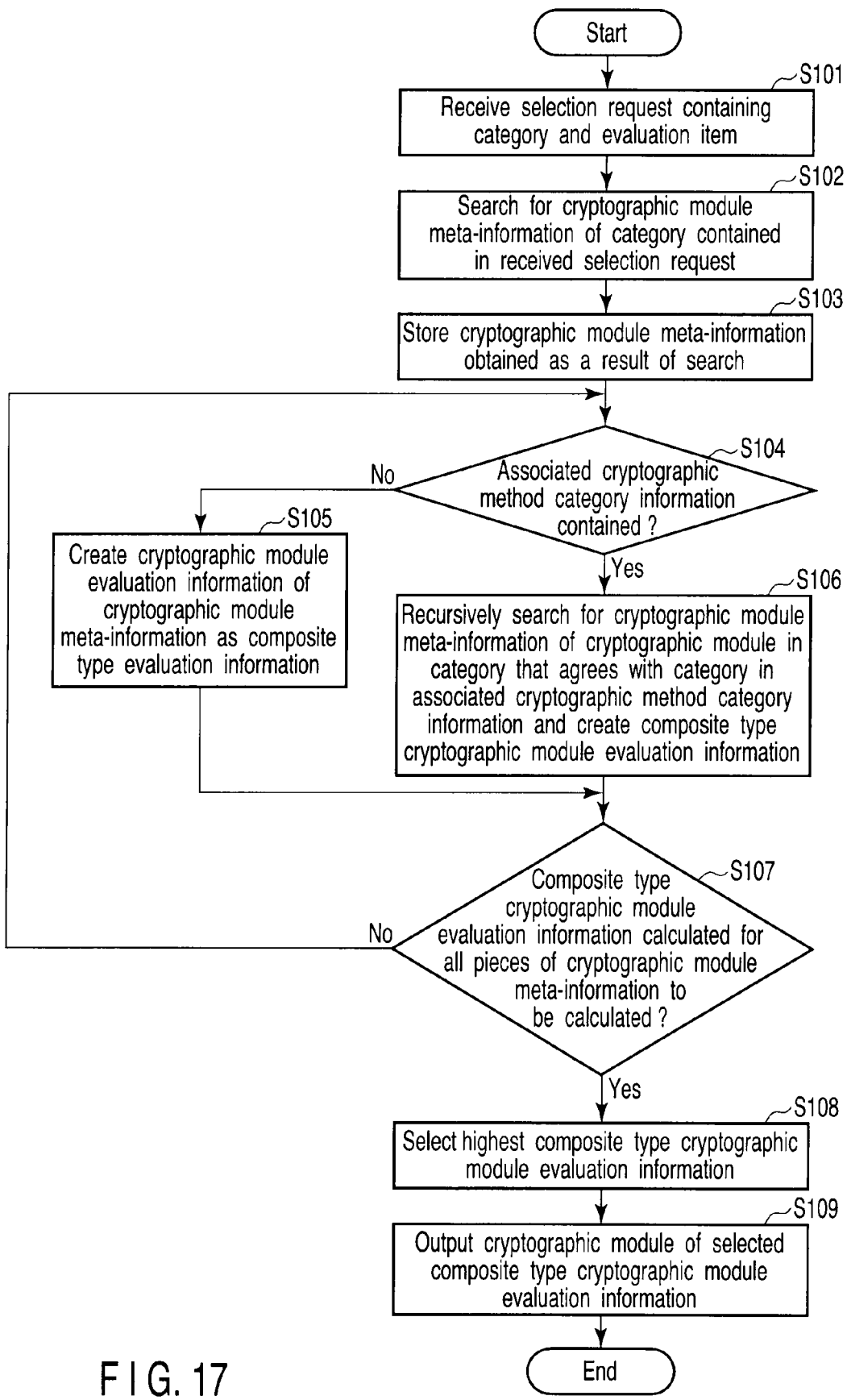
FIG. 17 is an explanatory flowchart of operations of the cryptographic module management apparatus according to the third embodiment of the invention.

Next, operations of the cryptographic module management apparatus 1 according to the above-described third embodiment will be described below. FIG. 17 is an explanatory flowchart of the operations of the cryptographic module management apparatus 1. First, if the side of a terminal device requires a "secure digital signature module", a selection request containing a category "digital signature" and evaluation item "security" to be selected is transmitted from the terminal device to the cryptographic module management apparatus 1.

If the selection request is transmitted from the terminal device to the cryptographic module management apparatus 1, the cryptographic module meta-information search portion 103 in the cryptographic module management apparatus 1 receives this selection request (step S101). Next, the cryptographic module meta-information search portion 103 searches the cryptographic module meta-information storage portion 101 for cryptographic module meta-information of a category indicating category "digital signature" contained in the received selection request (step S102). Then, the cryptographic module meta-information search portion 103 writes the cryptographic module meta-information obtained as its search result into the storage portion 104 (step S103). In this case, if a plurality of pieces of cryptographic module meta-information have been found as the search result, each of those obtained pieces of cryptographic module meta-information is written into the storage portion 104.

If the cryptographic module meta-information is written into the storage portion 104, the composite type cryptographic module evaluation calculation portion 105 decides whether associated cryptographic method category information is contained in this cryptographic module meta-information using the cryptographic module meta-information stored in the storage portion 104 as a starting point (step S104).

If no associated cryptographic method category information is contained in the cryptographic module meta-information (NO at step S104), the composite type cryptographic module evaluation calculation portion 105 generates cryptographic module evaluation information (evaluated mark for the evaluation item of "security" in this case) of the cryptographic module meta-information as composite type evaluation information (step S105).

On the other hand, if associated cryptographic method category information is contained in the cryptographic module meta-information (YES at step S104), the composite type cryptographic module evaluation calculation portion 105 searches for the cryptographic module meta-information of cryptographic modules in a category that agrees with that of this associated cryptographic method category information by using the cryptographic module meta-information search portion 103 and specifies the cryptographic module meta-information of each of the associated cryptographic modules obtained as a result of the search to thereby recursively invoke itself, thereby generating composite type cryptographic module evaluation information based on the resultantly obtained evaluation information (evaluated mark of the evaluation item of "security" in this case) of the associated cryptographic modules and composite type cryptographic module evaluation calculating formula information contained in the cryptographic module meta-information of these cryptographic modules (step S106).

If the composite type cryptographic module evaluation information is generated, the cryptographic module selection portion 106 decides whether composite type cryptographic module evaluation information is calculated for all the pieces of cryptographic module meta-information stored in the storage portion 104 (step S107) and, if a combination of the pieces of cryptographic module meta-information on which the composite type cryptographic module evaluation information is yet to be calculated is present among those pieces of cryptographic module meta-information stored in the storage portion 104, shifts to step S104 (NO at step S107) to specify the cryptographic module meta-information so that the composite type cryptographic module evaluation calculation portion 105 may calculate the composite type cryptographic module evaluation information.

On the other hand, if composite type cryptographic module evaluation information is calculated for all the cryptographic module meta-information pieces stored in the storage portion 104 (YES at step S107), the cryptographic module selection portion 106 selects such composite type cryptographic module evaluation information as to have the highest evaluated mark based on the composite type cryptographic module evaluation information of the combinations of the composite type pieces of cryptographic module evaluation information calculated by the composite type cryptographic module evaluation calculation portion 105 and the cryptographic module meta-information pieces used in calculation of those composite type cryptographic module evaluation information pieces (step S108) and outputs to the cryptographic module acquisition portion 107 such cryptographic module meta-information to be combined with this composite type cryptographic module evaluation information.

If the cryptographic module meta-information is output from the cryptographic module selection portion 106, the cryptographic module acquisition portion 107 reads a cryptographic module stored in the cryptographic module storage portion 102 based on a cryptographic module name contained in the cryptographic module meta-information and delivers the read cryptographic module to the terminal device that has been requested for selection (step S109).

Figure 18:
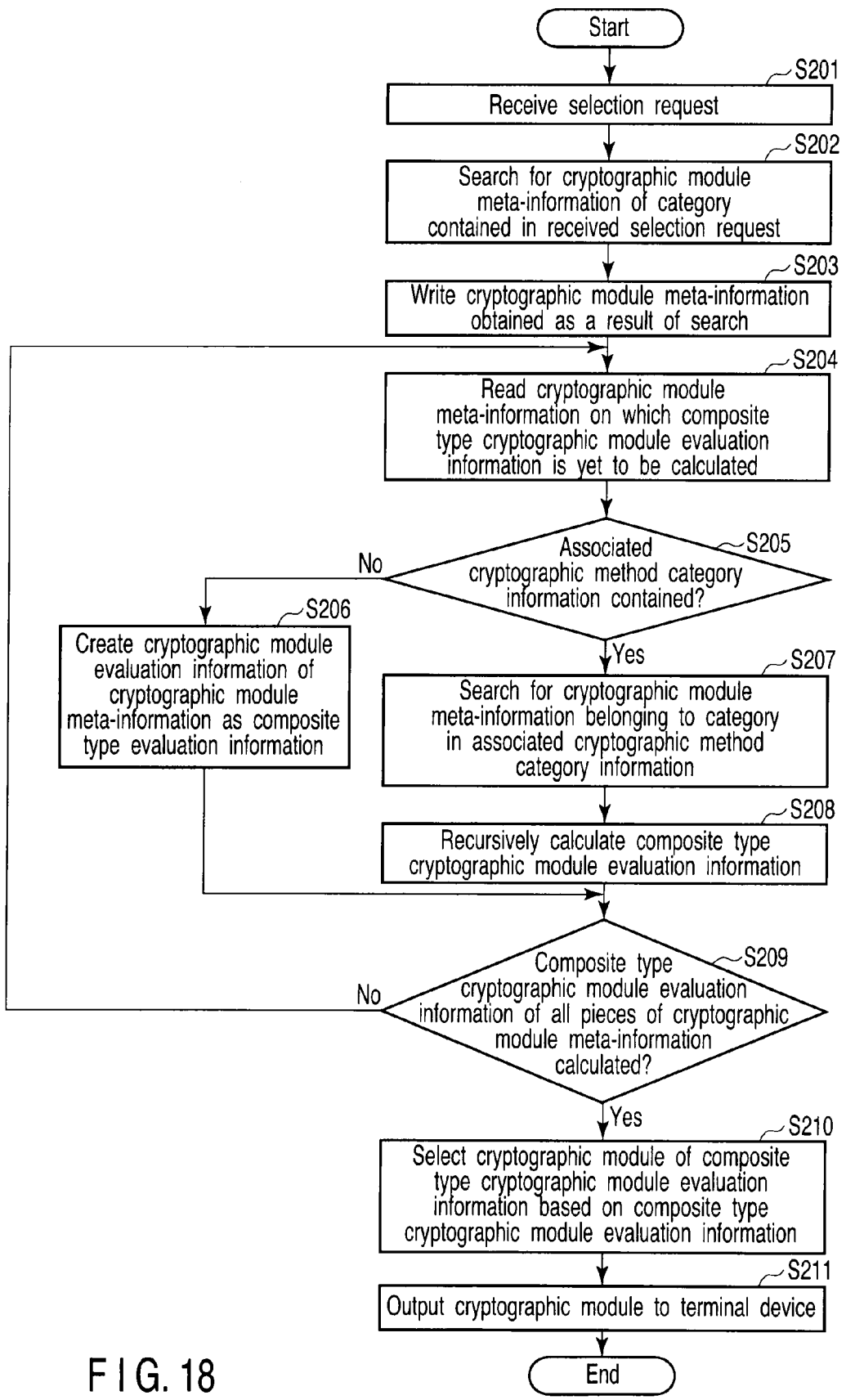
FIG. 18 is an explanatory flowchart of operations of a cryptographic module management apparatus according to a modification of the same embodiment.

Next, a variant of the cryptographic module management apparatus 1 according to the third embodiment will be described below with reference to a flowchart of FIG. 18.

First, if a "secure digital signature generation module" is required on the side of a terminal device, a selection request containing category "digital signature" and evaluation item "security" to be selected is transmitted from the terminal device to the cryptographic module management apparatus 1.

If the selection request is transmitted from the terminal device to the cryptographic module management apparatus 1, the cryptographic module meta-information search portion 103 in the cryptographic module management apparatus 1 receives this selection request (step S201). Next, the cryptographic module meta-information search portion 103 searches the cryptographic module meta-information storage portion 101 for cryptographic module meta-information of a category indicating category "digital signature" contained in the received selection request (step S202). Then, the cryptographic module meta-information search portion 103 writes the cryptographic module meta-information obtained as its search result into the storage portion 104 (step S203). In this case, if a plurality of pieces of cryptographic module meta-information have been found as the search result, those obtained pieces of cryptographic module meta-information are all written into the storage portion 104 by the cryptographic module meta-information search portion 103.

If the pieces of cryptographic module meta-information are written into the storage portion 104, the composite type cryptographic module evaluation calculation portion 105 selectively reads the cryptographic module meta-information on which the composite type cryptographic module evaluation information is yet to be calculated from among those pieces of cryptographic module meta-information stored in the storage portion 104 (step S204) and decides whether associated cryptographic method category information is contained in this read cryptographic module meta-information (step S205).

If no associated cryptographic method category information is contained in the cryptographic module meta-information (NO at step S205), the composite type cryptographic module evaluation calculation portion 105 generates cryptographic module evaluation information (evaluated mark for the evaluation item of "security" in this case) of the cryptographic module meta-information as composite type evaluation information (step S206).

On the other hand, if associated cryptographic method category information is contained in the cryptographic module meta-information (YES at step S205), the composite type cryptographic module evaluation calculation portion 105 recursively searches for the cryptographic module meta-information of cryptographic modules in a category that agrees with that of this associated cryptographic method category information by using the cryptographic module meta-information search portion 103 (step S206). This search is repeated and results thereof are stored by the cryptographic module meta-information search portion 103 into the storage portion 104 until cryptographic module meta-information not containing the associated cryptographic method category information is encountered.

Then, if the search results are stored in the storage portion 104, assuming the cryptographic module meta-information containing no associated cryptographic method category information is of a lower order and the cryptographic module meta-information read from the storage portion 104 is of a higher order, the composite type cryptographic module evaluation calculation portion 105 calculates the pieces of information in an ascending order based on the results of this search stored in the storage portion 104 (step S208). In this calculation, based on cryptographic module evaluation information of the cryptographic module meta-information, cryptographic module evaluation information of an associated cryptographic module belonging to the associated cryptographic method category information of the relevant cryptographic module meta-information, and composite type cryptographic module evaluation calculating formula information contained in the cryptographic module meta-information of the relevant cryptographic module, the composite type cryptographic module evaluation calculation portion 105 generates results of the calculation as composite type cryptographic module evaluation information of the cryptographic modules.

If the composite type cryptographic module evaluation information is generated, the composite type cryptographic module evaluation calculation portion 105 decides whether composite type cryptographic module evaluation information is calculated for all the pieces of cryptographic module meta-information stored in the storage portion 104 (step S209) and, if a combination of the pieces of cryptographic module meta-information on which the composite type cryptographic module evaluation information is yet to be calculated is present among those pieces of cryptographic module meta-information stored in the storage portion 104, processing shifts to step S204 (NO at step S209).

On the other hand, if composite type cryptographic module evaluation information is calculated for all the pieces of cryptographic module meta-information stored in the storage portion 104 (YES at step S209), the composite type cryptographic module evaluation calculation portion 105 outputs to the cryptographic module selection portion 106 a combination of the calculated composite type cryptographic module evaluation information and the cryptographic module meta-information used in the calculation of this composite type cryptographic module evaluation information. If a plurality of composite type pieces of cryptographic module evaluation information are calculated, it means that there exists a plurality of combinations of the calculated composite type cryptographic module evaluation information and the cryptographic module meta-information used in the calculation of this composite type cryptographic module evaluation information, and those multiple combinations are each output to the cryptographic module selection portion 106.

If the combinations of the composite type cryptographic module evaluation information and the cryptographic module meta-information are output from the composite type cryptographic module evaluation calculation portion 105, the cryptographic module selection portion 106 selects such composite type cryptographic module evaluation information as to have the highest mark from among the combinations of the composite type cryptographic module evaluation information and the cryptographic module meta-information output from the composite type cryptographic module evaluation calculation portion 105 based on the composite type cryptographic module evaluation information pieces (step S210) and outputs this composite type cryptographic module evaluation information and the cryptographic module meta-information to be combined with it to the cryptographic module acquisition portion 107.

If the cryptographic module meta-information is output from the cryptographic module selection portion 106, the cryptographic module acquisition portion 107 reads a cryptographic module stored in the cryptographic module storage portion 102 based on a cryptographic module name contained in the cryptographic module meta-information and delivers the read cryptographic module to the terminal device that has requested for selection (step S211).

According to the above-described third embodiment, if an associated cryptographic module is required to execute a cryptographic module, the cryptographic module and the associated cryptographic module will be combined in evaluation, so that it is possible to select a cryptographic module from among combinations of cryptographic modules in response to a selection request based on a result of the evaluation and deliver such cryptographic module to a terminal device that has requested for the selection.

Although the above third embodiment has been described with reference to a case where an evaluation item and an evaluated mark are correlated with each other as cryptographic module evaluation information and stored, usage restriction information such as a platform that can be executed by cryptographic modules, a maximum input length, and a maximum key length may also be stored so that a selection request by a terminal device is transmitted from the terminal device to the cryptographic module management apparatus containing terminal usage environment information that indicates a usage environment for this terminal device (e.g., a platform that can be executed by the terminal device, a maximum input length, and a maximum key length).

In this case, the cryptographic module selection portion 105 in the cryptographic module management apparatus 1 may calculate composite type cryptographic module evaluation information, sort cryptographic modules in a descending order of this calculated composite type cryptographic module evaluation information, and then compare the pieces of usage restriction information of cryptographic module evaluation information that attends the cryptographic modules and pieces of terminal usage environment information of a terminal device that has requested for selection in a descending order of the composite type cryptographic module evaluation information, thereby selecting the cryptographic module that is appended by such usage restriction information as to satisfy an environment indicated by the terminal usage environment information of the terminal device. For example, if a maximum input length and a maximum key length contained in terminal usage environment information agree respectively with a maximum input length and a maximum key length in usage restriction information which contains an executable platform that agrees with a platform that can be executed by a terminal device and which is contained in cryptographic module evaluation information appended to a cryptographic module, selection will be made as such usage restriction information as to satisfy the environment indicated by the terminal usage environment information of the terminal device. It is thus possible to select a cryptographic module that has a highest evaluation at the same time as meeting the usage conditions of the terminal device.

Fourth Embodiment

Next, the fourth embodiment will be described below. In contrast to the third embodiment that has been described with reference to a case where a combination of cryptographic modules are evaluated at the time of reception of a selection request from a terminal device so that based on a result of the evaluation, the cryptographic module might be selected and delivered to the terminal device, the fourth embodiment will be described with reference to a case where a combination of cryptographic modules are evaluated beforehand and stored.

Figure 19:
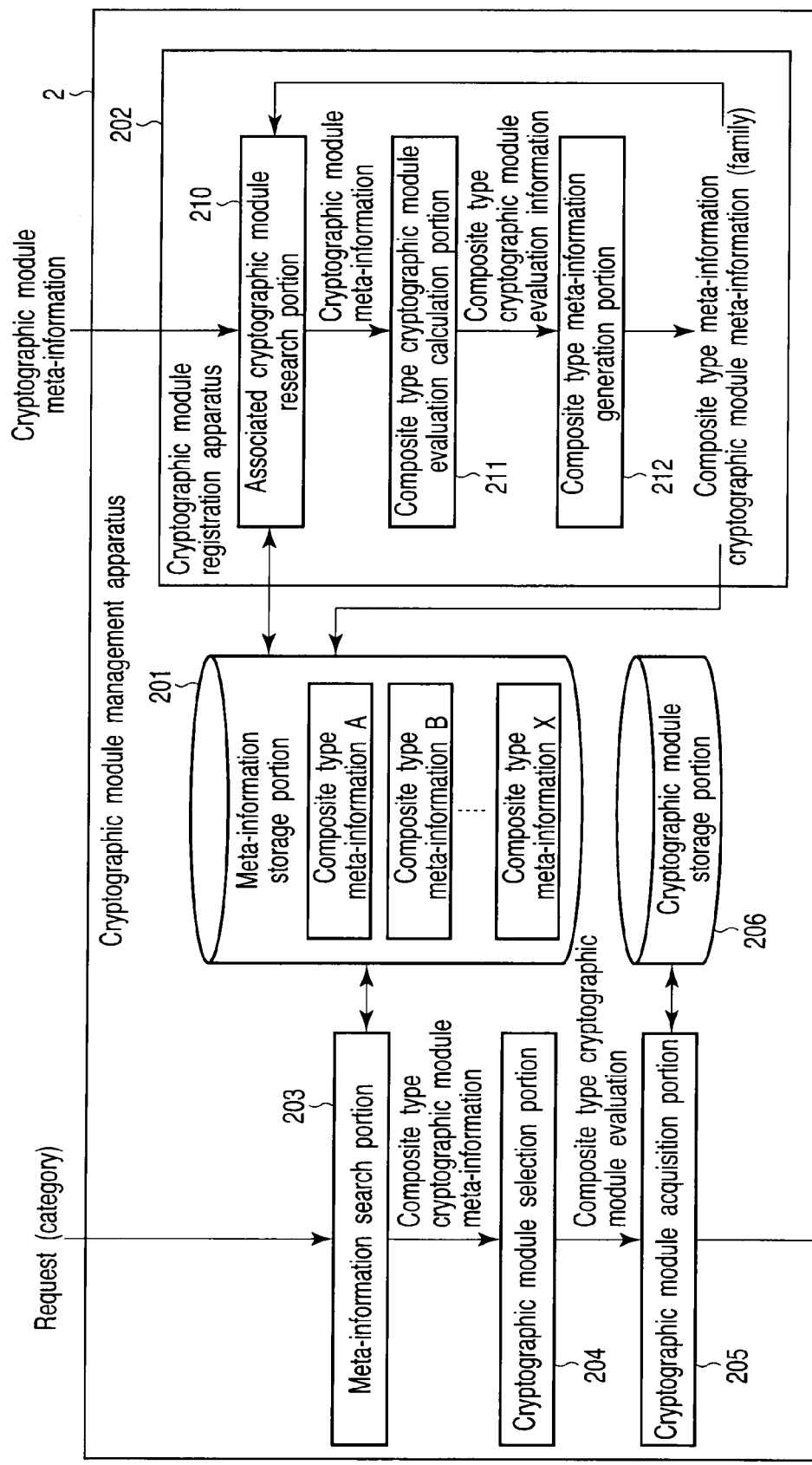
FIG. 19 is a block diagram of a constitution of a cryptographic module management apparatus according to a fourth embodiment.

The following will describe the fourth embodiment with reference to the drawings. FIG. 19 is a diagram of a constitution of a cryptographic module management apparatus according to the fourth embodiment. In this figure, a cryptographic module management apparatus 2 includes a meta-information storage portion 201, a cryptographic module registration apparatus 202, a meta-information search portion 203, a cryptographic module selection portion 204, a cryptographic module acquisition portion 205, and a cryptographic module storage portion 206. The cryptographic module selection portion 204, the cryptographic module acquisition portion 205, and the cryptographic module storage portion 206 correspond to the cryptographic module selection portion 106, the cryptographic module acquisition portion 107, and the cryptographic module storage portion 102 in the third embodiment and have the same functions, respectively.

The meta-information storage portion 201 stores cryptographic module meta-information and composite type meta-information. This cryptographic module meta-information is much the same as that described in the third embodiment. The cryptographic module registration apparatus 202 has an associated cryptographic module search portion 210, a composite type cryptographic module evaluation calculation portion 211, and a composite type meta-information generation portion 212.

The associated cryptographic module search portion 210 receives a cryptographic module transmitted from a registration request apparatus connected to the outside in a wireless or wired manner and cryptographic module meta-information of this cryptographic module. Then, first, if a category is described in associated cryptographic method category information of this cryptographic module meta-information, the associated cryptographic module search portion 210 searches the meta-information storage portion 201 for composite type meta-information whose composite type cryptographic method category agrees with this category (lower-order module's composite type meta-information) and outputs a suite of this cryptographic module meta-information and the composite type meta-information obtained as a result of the search. On the other hand, if no category is described in associated cryptographic method category information in this cryptographic module meta-information, first the associated cryptographic module search portion 210 outputs only this cryptographic module meta-information. Further, in accordance with a cryptographic module category in this cryptographic module meta-information, the associated cryptographic module search portion 210 searches for such cryptographic module meta-information that a category described in the associated cryptographic method category information may agree with this cryptographic module category (higher-order module's cryptographic module meta-information) and outputs a suite of this cryptographic module meta-information, the lower-order composite type meta-information, and the higher-order cryptographic module meta-information obtained as a result of the search. In this case, if a category is described in the associated cryptographic method category information of the cryptographic module meta-information found, the associated cryptographic module search portion 210 further searches the meta-information storage portion 201 for such composite type meta-information that a composite type cryptographic method category may agree with the category in this associated cryptographic method category information and outputs also the composite type meta-information obtained resultantly. The associated cryptographic module search portion 210 further searches the meta-information storage portion 201 recursively for such cryptographic module meta-information that a cryptographic module category in the obtained higher-order cryptographic module meta-information may agree with the associated cryptographic module category information (further higher-order cryptographic module meta-information) and outputs a pair of these. This process will be repeated until no higher-order cryptographic module meta-information is found. In short, the associated cryptographic module search portion 210 searches for and outputs all the suites of cryptographic module meta-information and composite type meta-information that correspond to the combination of cryptographic modules that can be executed in a condition where a cryptographic module transmitted from the registration request apparatus is included. In this case, it is only necessary to search the pieces of composite type meta-information for the combinations of the lower-order cryptographic modules, thereby mitigating the trouble of searching.

The composite type cryptographic module evaluation calculation portion 211 uses cryptographic module evaluation information in the cryptographic module meta-information and cryptographic module evaluation information described in the cryptographic module meta-information of a cryptographic module (lower-order module) belonging to a cryptographic module category described in associated cryptographic method category information in the cryptographic module meta-information or composite type cryptographic module evaluation information described in the composite type meta-information from among the combinations of the cryptographic module meta-information and composite type meta-information that have been found by the associated cryptographic module search portion 210 and, in accordance with the composite type cryptographic module evaluation calculating formula information of higher-order modules to which this lower-order module belongs, calculates composite type cryptographic module evaluation information, which is an evaluated value of these combinations.

The composite type meta-information generation portion 212 generates composite type meta-information based on a result of calculation by the composite type cryptographic module evaluation calculation portion 211 and writes it into the meta-information storage portion 201. In this embodiment, the composite type meta-information generation portion 212 writes also cryptographic module meta-information received by the associated cryptographic module search portion 210 into the meta-information storage portion 201.

Figure 20:
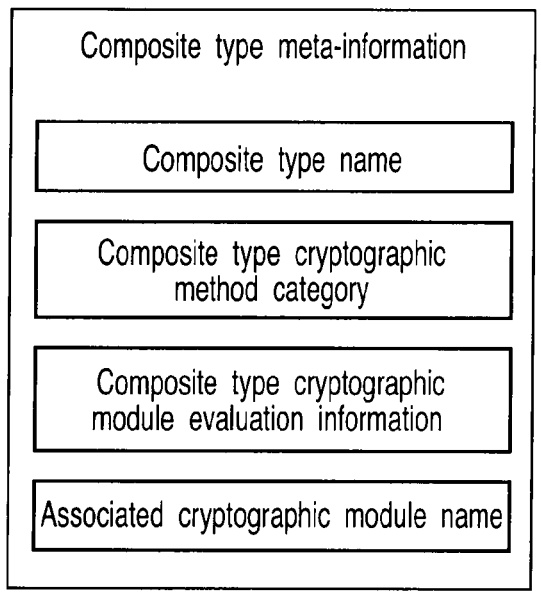
FIG. 20 is an explanatory table of composite type meta-information.

FIG. 20 shows one example of composite type meta-information. Complex type meta-information contains a composite type name, a composite type cryptographic method category, composite type evaluation information, and an associated cryptographic module name.

In this embodiment, the composite type name is information that identifies a combination of cryptographic modules. As the composite type cryptographic method category, such a category is stored as to indicate the category of the highest-order cryptographic module among the combinations of cryptographic modules. As the composite type evaluation information, such composite type cryptographic module evaluation information is stored as to have been generated by the composite type cryptographic module evaluation calculation portion 211. As the associated cryptographic module name, a cryptographic module name of cryptographic modules that have been combined in calculation of composite type cryptographic module evaluation information is stored.

Figure 21:
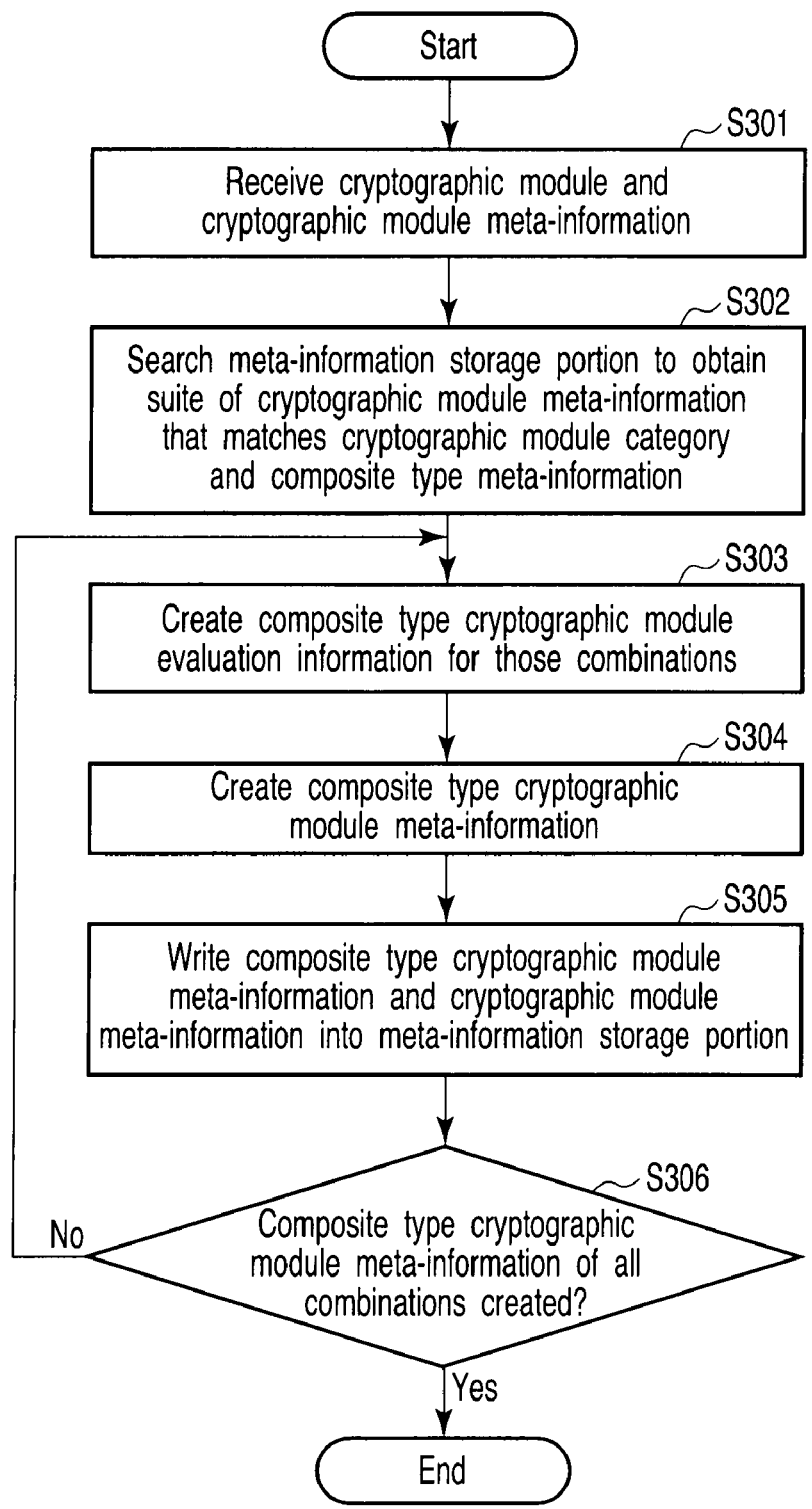
FIG. 21 is an explanatory flowchart of operations of the cryptographic module management apparatus.

Next, operations of the thus constituted cryptographic module management apparatus 2 will be described below with reference to FIG. 21. In the following, the operations will be described of storing a cryptographic module yet to be stored in the cryptographic module management apparatus 2 into it in a case where a plurality of cryptographic modules, cryptographic module meta-information, and composite type cryptographic meta-information are already stored in the cryptographic module management apparatus 2. FIG. 21 is an explanatory flowchart of the operations of the cryptographic module management apparatus 2 according to the fourth embodiment.

If a cryptographic module and cryptographic module meta-information are transmitted from the registration request apparatus connected to the outside of the cryptographic module management apparatus 2 to the cryptographic module management apparatus 2 together with a registration request, the associated cryptographic module search portion 210 receives these cryptographic module and cryptographic module meta-information (step S301). As described above, the associated cryptographic module search portion 210 searches the meta-information storage portion 201 for a suite of the cryptographic module meta-information and composite type meta-information (step S302).

If the suite of the cryptographic module meta-information and the composite type meta-information is obtained by the associated cryptographic module search portion 210, the composite type cryptographic module evaluation calculation portion 211 generates composite type cryptographic module evaluation information for these combinations as described above (step S303).

Then, if the composite type cryptographic module evaluation information is generated, the composite type cryptographic meta-information generation portion 212 generates composite type cryptographic meta-information (step S304) and writes into the meta-information storage portion 201 the generated composite type cryptographic meta-information and the cryptographic module meta-information received by the associated cryptographic module search portion 210 (step S305). In this case, based on the combination of the cryptographic module meta-information and the composite type meta-information for which the composite type cryptographic module evaluation information has been generated by the composite type cryptographic module evaluation calculation portion 211, the composite type cryptographic meta-information generation portion 212 generates information that identifies this combination and writes it as a composite type cryptographic method name into the composite type meta-information in the meta-information storage portion 201. Further, the composite type cryptographic meta-information generation portion 212 correlates a category of cryptographic module meta-information of the highest-order cryptographic module among the combinations of the cryptographic module meta-information for which the composite type cryptographic module evaluation information has been generated by the composite type cryptographic module evaluation calculation portion 211 with this generated composite type cryptographic method name and writes such information into the composite type meta-information in the meta-information storage portion 201. Further, the composite type cryptographic meta-information generation portion 212 correlates the composite type cryptographic module evaluation information calculated by the composite type cryptographic module evaluation calculation portion 211 with this generated composite type cryptographic method name and writes such cryptographic module evaluation information into the composite type cryptographic module evaluation information in the meta-information storage portion 201. Further additionally, if composite type cryptographic module evaluation information is calculated by the composite type cryptographic module evaluation calculation portion 211, the composite type cryptographic meta-information generation portion 212 correlates a cryptographic module name of each piece of the combined cryptographic module meta-information with this generated composite type cryptographic method name and writes the resultant information into the composite type meta-information in the meta-information storage portion 201 as an associated cryptographic module name.

Then, if a combination of cryptographic module meta-information in which no composite type cryptographic meta-information is generated yet is found as a result of search for a plurality of combinations by the associated cryptographic module search portion 210, the composite type cryptographic meta-information generation portion 212 shifts to step S303 (NO at S306) and, if such combination is not found, ends the processing (YES at S306). In such a manner, composite type meta-information is generated and stored in the meta-information storage portion 201.

After the composite type meta-information is thus registered in the meta-information storage portion 201, in a case where a "secure digital signature generation module" is required on the side of the terminal device, if a selection request containing category "digital signature" and evaluation item "security" to be selected is transmitted from the terminal device to the cryptographic module management apparatus 2, the meta-information search portion 203 searches the meta-information storage portion 201 in accordance with a category contained in the selection request from the terminal device and obtains composite type meta-information whose composite type cryptographic method category agrees with that category and then outputs the obtained composite type cryptographic meta-information to the cryptographic module selection portion 204.

As in the case of the third embodiment, the cryptographic module selection portion 204 selects the optimal composite type meta-information that meets the requirements based on evaluation information described in the composite type meta-information and reads a cryptographic module from the cryptographic module storage portion 206 based on an associated cryptographic module name of the selected composite type cryptographic meta-information and outputs it to the terminal device.

As described above, cryptographic module evaluation for each of the combinations of cryptographic modules is calculated at a point in time when a cryptographic module registration request is received and written into the meta-information storage portion 201, thus eliminating the need for calculating evaluation information at a point in time when a selection request is received. Therefore, as compared to the case of calculating the evaluation information after the reception of a selection request, loads on processing from the reception of the selection request to the selection of the cryptographic module can be reduced by as much as processing to calculate the evaluation information. It is thus possible to accommodate cryptographic module selection requests from a plurality of clients.

Fifth Embodiment

Next, the fifth embodiment will be described below. This fifth embodiment will be described with reference to the case of deleting a cryptographic module from a cryptographic module management apparatus if this cryptographic module is hazarded.

Figure 22:
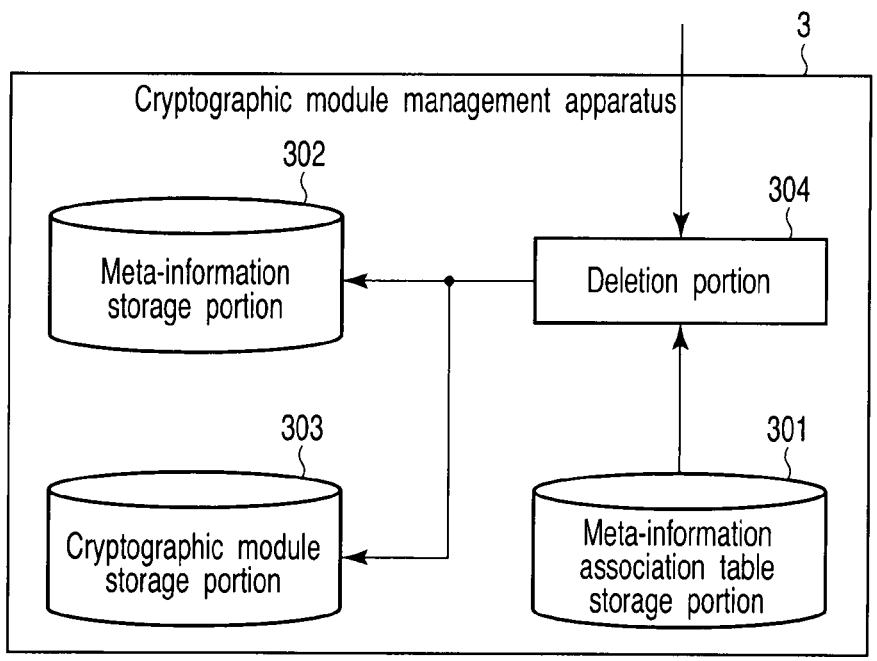
FIG. 22 is a block diagram outline of a constitution of a cryptographic module management apparatus according to a fifth embodiment of the invention.

FIG. 22 is a block diagram outline of the constitution of a cryptographic module management apparatus 3 according to the fifth embodiment. In this figure, a meta-information association table storage portion 301 stores a relationship between a cryptographic module and an associated cryptographic module required by this cryptographic module. A meta-information storage portion 302 stores composite type meta-information and cryptographic module meta-information. These composite type meta-information and cryptographic module meta-information are the same as, for example, those in the fourth embodiment. A cryptographic module storage portion 303 stores cryptographic modules.

A deletion portion 304 receives a cryptographic module name of a hazarded cryptographic module and a deletion request from a management apparatus connected to the outside of the cryptographic module management apparatus 3, searches the meta-information association table storage portion 301 based on the received cryptographic module name and, based on a result of the search, deletes a cryptographic module that matches the received cryptographic module name.

FIG. 23 is a table showing one example of the meta-information association table which is stored in the meta-information association table storage portion 301. In this figure, the meta-information association table is composed of higher-order module names and lower-order module names. In the present embodiment, to a cryptographic module name of the higher-order module name, a cryptographic module name in cryptographic module meta-information in which is set a category that agrees with an associated cryptographic method category in cryptographic module meta-information containing this cryptographic module name of the higher-order module name is correlated.

Further, if an associated cryptographic module is included in the cryptographic modules having a cryptographic module name stored as a lower-order module name, a cryptographic module name stored as this lower-order information and a cryptographic module name of the associated cryptographic module are stored in the meta-information association table as a higher-order module name and a lower-order module name, respectively.

In FIG. 23, to a cryptographic module name a, lower-order cryptographic module names b and c are respectively correlated and stored. Also, to a cryptographic module name c, a lower-order cryptographic module name d is correlated and stored.

Operations of the thus constituted cryptographic module management apparatus 3 will be described below. It is here assumed that higher-order cryptographic module names and lower-order cryptographic module names are stored in the meta-information association table storage portion 301 in a condition where they are correlated with each other.

If a cryptographic module name and a deletion request are transmitted from an external management apparatus to the cryptographic module management apparatus 3, the deletion portion 303 searches the meta-information association table storage portion 301 for the lower-order module names to decide whether they include any cryptographic module names that agree with the cryptographic module name requested to be deleted. If those lower-order module names include no cryptographic module name that agrees with the cryptographic module name requested to be deleted, the deletion portion 303 ends the processing and, if those lower-order module names include a cryptographic module name that agrees with the cryptographic module name requested to be deleted, deletes those lower-order module names and the cryptographic module name of a higher-order module name corresponding to those lower-order module names from the meta-information association table storage portion 301, deletes the cryptographic module meta-information from the meta-information storage portion 201 based on the deleted cryptographic module names and, further, deletes the cryptographic modules from the cryptographic module storage portion 303 based on the cryptographic module names thus deleted.

As another effect according to this fifth embodiment, also if you want to know by how many lower-order modules a cryptographic module is referenced in order to know how much the system is influenced if that cryptographic module is hazarded, you can know the number of those higher-order modules by referencing this meta-information management table.

Note that the above-described cryptographic module management apparatuses 1, 2, and 3 may be fitted to the side of the server apparatus or the side of the client terminal in the cryptographic module delivery system. For example, if a plurality of cryptographic modules can be held on the side of the client terminal beforehand, this cryptographic module management apparatus in the client terminal may manage those cryptographic modules. It is thus possible to efficiently select and manage the cryptographic modules only in the client in response to a cryptographic module request from an application.

Programs required to implement the functions of the cryptographic client apparatus, the cryptographic module management server, and the cryptographic module management apparatus in FIGS. 2, 3, 5, 12, 13, 19, and 22 may be recorded in a computer-readable recording medium to be read into a computer system and executed, thereby managing cryptographic modules. Note that the term "computer system" here is assumed to include the OS and hardware such as peripherals.

Further, the term "computer system" is assumed to include a homepage providing environment (or display environment) if the WWW system is utilized.

Further, the term "computer-readable recording medium" refers to a transportable medium such as a flexible disk, a magneto-optical disk, an ROM, or CD-ROM or a storage device built in a computer system such as a hard disk. Moreover, the term "computer-readable recording medium" is assumed to include also a medium which will dynamically hold a program for a short period of time, such as a communication wire in the case of transmitting the program through a network such as the Internet, or a communication line such as a phone line, and a medium which will hold the program for a certain period of time, such as a volatile memory inside the computer system, that serves as a server or a client in such a case. Further, this program may be given to realize some of the above-described functions or may even realize those functions by combining programs already recorded in the computer system.

Although the embodiments of the invention have been described in detail with reference to the drawings, it is to be understood that the invention is not limited to the specific constitution of those embodiments and covers such designs etc. as not to depart from the gist of the invention.

What is claimed is:

1. A cryptographic module management apparatus which manages a plurality of cryptographic modules to select a cryptographic module in response to a cryptographic module selection request and outputs the selected cryptographic module, the cryptographic module management apparatus comprising:
    a cryptographic module storage device which stores said plurality of cryptographic modules;
    a cryptographic module meta-information storage device which stores cryptographic module meta-information containing category information indicating a category to which each of the cryptographic modules belongs, first evaluation information indicating a predetermined evaluation result of each of the cryptographic modules, category information indicating, if any associated cryptographic module is required other than the cryptographic modules, a category to which such other associated cryptographic module belongs, and derivation method information indicating a method of deriving composite type cryptographic module evaluation information which indicates predetermined evaluation information of evaluation performed on a case where the cryptographic modules and such other associated cryptographic module are combined, from the first evaluation information and second evaluation information indicating a predetermined evaluation result of such other associated cryptographic module, the first evaluation information indicating marks of the cryptographic module security, a speed and an amount of memory used, the second evaluation information indicating marks of the associated cryptographic module security, a speed and an amount of memory used, the composite type cryptographic module evaluation information indicating marks of security, a speed and an amount of memory used, the derivation method information including a calculating formula for calculating the composite type cryptographic module evaluation information based on the first evaluation information and the second evaluation information;
    a cryptographic module meta-information search device configured to search the cryptographic module meta-information storage device for the cryptographic module meta-information based on the category information of the requested cryptographic module,
    the selection request including the category information of the requested cryptographic module, and conditions such as security, a speed, and a memory amount to be used;
    a composite type cryptographic module evaluation calculation device configured to generate the composite type cryptographic module evaluation information as the evaluation information of the cryptographic modules based on, if associated cryptographic module category information is contained in the cryptographic module meta-information searched for by the cryptographic module meta-information search device, the second evaluation information which is the composite type cryptographic module evaluation information obtained by searching for the cryptographic module meta-information of the associated cryptographic module by using the cryptographic module meta-information search device and specifying the cryptographic module meta-information of each of the associated cryptographic modules obtained as a result of the search to thereby recursively invoke this composite type cryptographic module evaluation calculation device; the conditions included in the selection request; and the derivation method information contained in the cryptographic module meta-information of the cryptographic modules;
    a cryptographic module selection device configured to obtain the result of calculation by the composite type cryptographic module evaluation calculation device and, based on this obtained calculation result, select the cryptographic module; and
    a cryptographic module acquisition device configured to read from the cryptographic module storage device the cryptographic module selected by the cryptographic module selection device and output such cryptographic module.

2. The cryptographic module management apparatus according to claim 1, wherein if the second category information is not contained in the specified cryptographic module meta-information, the composite type cryptographic module evaluation calculation device generates, as the composite type cryptographic module evaluation information, the first evaluation information of the cryptographic modules.

3. A cryptographic module management apparatus which manages a plurality of cryptographic modules to select the cryptographic module in response to a cryptographic module selection request and output the selected cryptographic module, the cryptographic module management apparatus comprising:
    a cryptographic module storage device which stores said plurality of cryptographic modules;
    a composite type meta-information storage device which stores composite type meta-information containing category information indicating a category of the highest-order cryptographic module of the cryptographic modules to be combined, composite type cryptographic module evaluation information indicating predetermined evaluation information of evaluation performed in a case where the cryptographic modules are combined, and combined cryptographic module identification information containing cryptographic module identification information which identifies each cryptographic module included in a combination of the cryptographic modules;
    cryptographic module selection devices configured to search the composite type meta-information storage device for a plurality of pieces of the composite type meta-information based on the category information of the cryptographic modules corresponding to the selection request and, based on the composite type cryptographic module evaluation information in the composite type meta-information obtained and conditions included in the selection request, select the cryptographic modules to be included in the combination, the selection request including the category information of the requested cryptographic module, and the conditions such as security, a speed, and a memory amount to be used; and a cryptographic module acquisition device configured to read from the cryptographic module storage device the cryptographic module selected by the cryptographic module selection device and output such selected cryptographic module, wherein the composite type cryptographic module evaluation information is evaluation information of evaluation performed in the case where the cryptographic modules are combined, the evaluation information being calculated using a predetermined derivation method based on the evaluation information of each of the cryptographic modules to be combined, the evaluation information of each of the cryptographic modules indicating marks of each of the cryptographic module security, a speed and an amount of memory used, the predetermined derivation method including a calculating formula for calculating the composite type cryptographic module evaluation information based on the evaluation information of each of the cryptographic modules.

4. The cryptographic module management apparatus according to claim 3, further comprising:

a cryptographic module meta-information storage device which stores cryptographic module meta-information containing category information indicating a category to which the cryptographic modules belong, evaluation information indicating a result of evaluation of the cryptographic modules, associated cryptographic module category information indicating, if any associated cryptographic module is required to execute the cryptographic modules, the category to which the associated cryptographic module belongs, and derivation method information indicating a method of deriving composite type evaluation information which indicates the evaluation information of evaluation performed in a case where the cryptographic modules and the associated cryptographic module are combined, from the evaluation information set to the cryptographic modules and the evaluation information set to the associated cryptographic module if the associated cryptographic module is required to execute the cryptographic module;

a composite type cryptographic module evaluation calculation device configured to generate the composite type cryptographic module evaluation information as the evaluation information of the cryptographic modules based on, if the associated cryptographic module category information is contained in the specified cryptographic module meta-information, the evaluation information of the associated cryptographic module obtained by searching for the cryptographic module meta-information of the associated cryptographic modules by using the cryptographic module meta-information search device and specifying the cryptographic module meta-information of each of the associated cryptographic modules obtained as a result of the search to thereby recursively invoke the composite type cryptographic module evaluation calculation device; and the derivation method information contained in the cryptographic module meta-information of the cryptographic modules; and a writing device configured to write into the composite type meta-information storage device the composite type cryptographic module evaluation calculated by the composite type cryptographic module evaluation calculation device.

5. The cryptographic module management apparatus according to claim 4, wherein if the associated cryptographic module category information is not contained in the specified cryptographic module meta-information, the composite type cryptographic module evaluation calculation device generates the evaluation information of the cryptographic modules as the composite type cryptographic module evaluation information.

6. A cryptographic module management method in a cryptographic module management apparatus which manages a plurality of cryptographic modules to select the cryptographic module in response to a cryptographic module selection request and output the chosen cryptographic module, the cryptographic module management apparatus comprising:

a cryptographic module storage device which stores said plurality of cryptographic modules; and a cryptographic module meta-information storage device which stores cryptographic module meta-information containing category information indicating a category to which each of the cryptographic modules belongs, first evaluation information indicating a predetermined evaluation result of each of the cryptographic modules, category information indicating, if any associated cryptographic module is required to execute the cryptographic modules, a category to which the other associated cryptographic module belongs, and derivation method information indicating a method of deriving composite type cryptographic module evaluation information which indicates predetermined evaluation information of evaluation performed in a case where the cryptographic modules and the other associated cryptographic module are combined, from the first evaluation information and second evaluation information indicating a predetermined evaluation result of the other associated cryptographic module, the first evaluation information indicating marks of the cryptographic module security, a speed and an amount of memory used, the second evaluation information indicating marks of the associated cryptographic module security, a speed and an amount of memory used, the composite type cryptographic module evaluation information indicating marks of security, a speed and an amount of memory used, the derivation method information including a calculating formula for calculating the composite type cryptographic module evaluation information based on the first evaluation information and the second evaluation information;

wherein a cryptographic module meta-information search device searches the cryptographic module meta-information storage device for the cryptographic module meta-information based on the category information of the requested cryptographic module, the selection request including the category information of the requested cryptographic module, and conditions such as security, a speed, and a memory amount to be used;

the composite type cryptographic module evaluation calculation device generates the composite type cryptographic module evaluation information as the evaluation information of the cryptographic modules, and provides such evaluation information as the evaluation result, based on, if associated cryptographic module category information is contained in the cryptographic module meta-information searched for by the cryptographic module meta-information search device, the second evaluation information which is the composite type cryptographic module evaluation information obtained by searching for the cryptographic module meta-information of the associated cryptographic module by using the cryptographic module meta-information search device and specifying the cryptographic module meta-information of each of the associated cryptographic modules obtained as a result of the search to thereby recursively invoke this composite type cryptographic module evaluation calculation device; the conditions included in the selection request; and the derivation method information contained in the cryptographic module meta-information of those cryptographic modules, a cryptographic module selection device obtains the result of calculation by the composite type cryptographic module evaluation calculation device by specifying the cryptographic module meta-information in response to the selection request and, based on this obtained calculation result, selects the cryptographic module, and a cryptographic module acquisition device reads from the cryptographic module storage device the cryptographic module selected by the cryptographic module selection device and outputs it.

7. A non-transitory computer-readable recording medium storing a computer program used in a cryptographic module management apparatus comprising:

a cryptographic module storage device which stores a plurality of cryptographic modules; and a cryptographic module meta-information storage device which stores cryptographic module meta-information containing category information indicating a category to which each of the cryptographic modules belongs, first evaluation information indicating a predetermined evaluation result of each of those cryptographic modules, category information indicating, if any associated cryptographic module is required to execute those cryptographic modules, a category to which the other associated cryptographic module belongs, and derivation method information indicating a method of deriving composite type cryptographic module evaluation information which indicates predetermined evaluation information of evaluation performed on a case where those cryptographic modules and the other associated cryptographic module are combined, from the first evaluation information and second evaluation information indicating a predetermined evaluation result of the other associated cryptographic module, the program including:

a program code which causes the cryptographic module management apparatus to sequentially perform processing for searching the cryptographic module meta-information storage device for the cryptographic module meta-information based on the category information of the requested cryptographic module, the selection request including the category information of the requested cryptographic module, and conditions including at least one of security, a speed, and a memory amount to be used;

a program code which causes the cryptographic module management apparatus to sequentially perform processing for generating the composite type cryptographic module evaluation information as the evaluation information of the cryptographic modules, and providing such composite type cryptographic module evaluation information as the evaluation result, based on, if associated cryptographic module category information is contained in the cryptographic module meta-information searched for by the cryptographic module meta-information search device, the second evaluation information which is the composite type cryptographic module evaluation information obtained by searching for the cryptographic module meta-information of the associated cryptographic module by using the cryptographic module meta-information search device and specifying the cryptographic module meta-information of each of the associated cryptographic modules obtained as a result of the search to thereby recursively invoke this composite type cryptographic module evaluation calculation device; the conditions included in the selection request; and the derivation method information contained in the cryptographic module meta-information of those cryptographic modules;

a program code which causes the cryptographic module management apparatus to sequentially perform processing for specifying the cryptographic module meta-information in response to the selection request and providing the cryptographic module meta-information as the evaluation result and, based on this evaluation result, selecting the cryptographic module; and a program code which causes the cryptographic module management apparatus to sequentially perform processing for reading the selected cryptographic module from the cryptographic module storage device and outputting the selected cryptographic module;

wherein the first evaluation information indicates marks of the cryptographic module security, a speed and an amount of memory used, the second evaluation information indicates marks of the associated cryptographic module security, a speed and an amount of memory used, the composite type cryptographic module evaluation information indicates marks of security, a speed and an amount of memory used, the derivation method information includes a calculating formula for calculating the composite type cryptographic module evaluation information based on the first evaluation information and the second evaluation information.

8. The cryptographic module management apparatus according to claim 1, wherein the first evaluation information includes usage restriction information including at least one of a platform that can be executed by cryptographic modules, a maximum input length, and a maximum key length usage.

9. The cryptographic module management method according to claim 6, wherein the first evaluation information includes usage restriction information including at least one of a platform that can be executed by cryptographic modules, a maximum input length, and a maximum key length usage.

10. The non-transitory computer readable recording medium storing a computer program used in a cryptographic module management apparatus according to claim 7, wherein the first evaluation information includes usage restriction information including at least one of a platform that can be executed by cryptographic modules, a maximum input length, and a maximum key length usage.

* * * * *

UNITED STATES PATENT AND TRADEMARK OFFICE
CERTIFICATE OF CORRECTION

PATENT NO. : 8,406,422 B2
APPLICATION NO. : 12/233131
DATED : March 26, 2013
INVENTOR(S) : Shingo Miyazaki et al.

Page 1 of 1

It is certified that error appears in the above-identified patent and that said Letters Patent is hereby corrected as shown below:

On the title page, Item (73), the Assignees' Information is incorrect. Item (73) should read:

--(73) Assignees: Toshiba Solutions Corporation, Tokyo (JP); Yokosuka Telecom Research Park, Inc., Yokosuka-shi (JP)--

Signed and Sealed this
Twenty-eighth Day of May, 2013

Teresa Stanek Rea
*Acting Director of the United States Patent and Trademark Office*